United States Patent
Nakazawa et al.

(10) Patent No.: US 10,207,690 B2
(45) Date of Patent: *Feb. 19, 2019

(54) BRAKE APPARATUS

(71) Applicant: Hitachi Automotive Systems, Ltd., Hitachinaka-shi, Ibaraki (JP)

(72) Inventors: Chiharu Nakazawa, Kawasaki (JP); Ryohei Maruo, Kawasaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 68 days.

This patent is subject to a terminal disclaimer.

(21) Appl. No.: 15/308,620

(22) PCT Filed: Apr. 23, 2015

(86) PCT No.: PCT/JP2015/062388
§ 371 (c)(1),
(2) Date: Nov. 3, 2016

(87) PCT Pub. No.: WO2015/170597
PCT Pub. Date: Nov. 12, 2015

(65) Prior Publication Data
US 2017/0190328 A1 Jul. 6, 2017

(30) Foreign Application Priority Data
May 8, 2014 (JP) .................. 2014-096895

(51) Int. Cl.
*B60T 8/36* (2006.01)
*B60T 11/16* (2006.01)
(Continued)

(52) U.S. Cl.
CPC .............. *B60T 8/368* (2013.01); *B60T 7/042* (2013.01); *B60T 11/16* (2013.01); *B60T 11/165* (2013.01);
(Continued)

(58) Field of Classification Search
CPC ........ B60T 8/368; B60T 11/165; B60T 11/22; B60T 13/686; B60T 2220/04
(Continued)

(56) References Cited

U.S. PATENT DOCUMENTS 5,395,164 A * 3/1995 Sulzyc .................... B60T 7/042
188/151 A
5,607,207 A 3/1997 Nagashima et al.
(Continued)

FOREIGN PATENT DOCUMENTS

JP 11-321621 A 11/1999
JP 2004-168281 A 6/2004
(Continued)

OTHER PUBLICATIONS

International Search Report (PCT/ISA/210) issued in PCT Application No. PCT/JP2015/062388 dated Jun. 9, 2015 with English translation (4 pages).
(Continued)

Primary Examiner — Thomas J Williams
Assistant Examiner — James K Hsiao
(74) Attorney, Agent, or Firm — Crowell & Moring LLP

(57) ABSTRACT

An object of the present invention is to provide a brake apparatus that allows low-cost attachment of a stroke sensor that detects a stroke amount of a brake pedal. The brake apparatus is configured in such a manner that the stroke sensor that detects an amount of an axial stroke of a piston is disposed between one side surface of a master cylinder housing and one side surface of a valve housing, and an output of the stroke sensor is transmitted via a through-hole formed on the valve housing when being transmitted to a control unit attached to an opposite side surface-side of the valve housing.

20 Claims, 15 Drawing Sheets

(51) Int. Cl.
- *B60T 13/66* (2006.01)
- *B60T 7/04* (2006.01)
- *B60T 13/14* (2006.01)
- *B60T 13/68* (2006.01)
- *B60T 11/22* (2006.01)
- *B60T 8/40* (2006.01)

(52) U.S. Cl.
CPC ............ *B60T 11/22* (2013.01); *B60T 13/146* (2013.01); *B60T 13/662* (2013.01); *B60T 13/686* (2013.01); *B60T 8/4081* (2013.01); *B60T 2220/04* (2013.01)

(58) Field of Classification Search
USPC ........................................................ 303/113.4
See application file for complete search history.

(56) References Cited

U.S. PATENT DOCUMENTS

| | | | |
|---|---|---|---|
| 6,042,200 | A | 3/2000 | Hosoya et al. |
| 6,969,128 | B2 | 11/2005 | Sekihara |
| 9,457,784 | B2 | 10/2016 | Tokoi et al. |
| 9,777,751 | B2 | 10/2017 | Murayama et al. |
| 9,802,595 | B2 | 10/2017 | Kratzer |
| 2002/0190572 | A1 | 12/2002 | Nakazawa |
| 2004/0020201 | A1 | 2/2004 | Feigel et al. |
| 2004/0113488 | A1* | 6/2004 | Sekihara ................ B60T 8/368 303/119.3 |
| 2009/0179485 | A1* | 7/2009 | Yang ........................ B60T 7/042 303/20 |
| 2009/0195060 | A1* | 8/2009 | Nishikawa ............. B60T 8/3225 303/116.1 |
| 2012/0298897 | A1* | 11/2012 | Nakamura ............ B60T 8/3675 251/129.15 |
| 2013/0139501 | A1* | 6/2013 | Matsunaga ............... F15B 1/26 60/562 |
| 2013/0333375 | A1* | 12/2013 | Inoue ...................... B60T 7/042 60/545 |
| 2014/0216866 | A1* | 8/2014 | Feigel ..................... B60T 7/042 188/156 |
| 2014/0298785 | A1* | 10/2014 | Muller .................. B60T 17/221 60/327 |
| 2014/0298797 | A1* | 10/2014 | Murayama ............... B60T 8/368 60/533 |
| 2014/0331758 | A1* | 11/2014 | Sim ......................... B60T 7/042 73/132 |
| 2015/0158466 | A1* | 6/2015 | Nakamura .............. B60T 11/16 303/3 |
| 2015/0158474 | A1 | 6/2015 | Matsunaga et al. |
| 2015/0166030 | A1* | 6/2015 | Kobayashi ............. B60T 13/58 303/14 |
| 2015/0203085 | A1* | 7/2015 | Maruo .................... B60T 8/368 303/10 |
| 2016/0185329 | A1 | 6/2016 | Lee et al. |
| 2016/0264114 | A1 | 9/2016 | Maruo et al. |
| 2016/0272173 | A1* | 9/2016 | Shin ........................ B60T 8/368 |
| 2017/0190328 | A1 | 7/2017 | Nakazawa et al. |

FOREIGN PATENT DOCUMENTS

| | | |
|---|---|---|
| JP | 2005-221035 A | 8/2005 |
| JP | 2006-21669 A | 1/2006 |
| JP | 2013-227011 A | 11/2013 |
| JP | 2014-19343 A | 2/2014 |
| WO | WO 2013/064651 A1 | 5/2013 |

OTHER PUBLICATIONS

Japanese-language Written Opinion (PCT/ISA/237) issued in PCT Application No. PCT/JP2015/062388 dated Jun. 9, 2015 (3 pages).
International Search Report (PCT/ISA/210) issued in PCT Application No. PCT/JPEP2015/069936 dated Oct. 6, 2015 with English translation (four (4) pages).
Japanese-language Written Opinion (PCT/ISA/237) issued in PCT Application No. PCT/JPEP2015/069936 dated Oct. 6, 2015 (five (5) pages).

\* cited by examiner

CROSS-SECTIONAL VIEW
TAKEN ALONG LINE B-B

BRAKE APPARATUS

TECHNICAL FIELD

The present invention relates to a brake control apparatus that provides a braking force to a vehicle.

BACKGROUND ART

Conventionally, there has been known a technique discussed in Patent Literature 1 as a brake apparatus. In this patent literature, a sensor that detects a displacement amount of a piston in a master cylinder is mounted in the master cylinder as a measure for detecting an amount of a brake operation performed by a driver.

CITATION LIST

Patent Literature

PTL 1: International Publication No. WO2013064651A

SUMMARY OF INVENTION

Technical Problem

However, Patent Literature 1 has left room to consider how to lay out a wiring for connecting the stroke sensor and a control unit. An object of the present invention is to provide a brake apparatus that allows low-cost attachment of the stroke sensor that detects a stroke amount of a brake pedal.

Solution to Problem

To achieve the above-described object, a brake apparatus according to one aspect of the present invention is configured in such a manner that a stroke sensor that detects an amount of an axial stroke of a piston is disposed between one side surface of a master cylinder housing and one side surface of a valve housing, and an output of the stroke sensor is transmitted via a through-hole formed on the valve housing when being transmitted to a control unit attached to another side of the valve housing where another side surface thereof is located.

Advantageous Effects of Invention

This configuration allows the stroke sensor and the control unit to be internally connected to each other similarly to other electromagnetic valves and the like, and thus can prevent or cut down a cost increase.

DESCRIPTION OF EMBODIMENTS

First Embodiment

Figure 1:
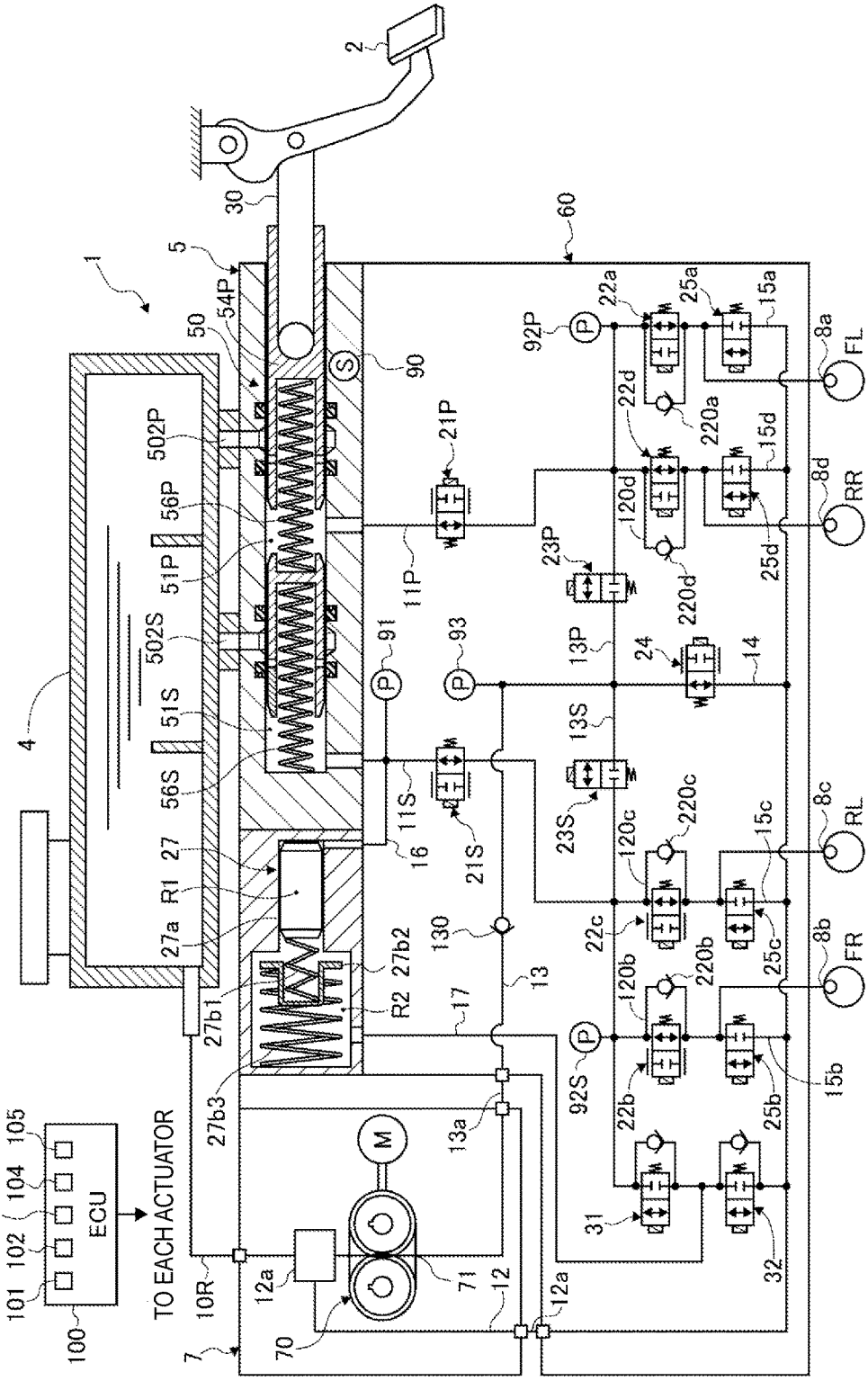
FIG. 1 is a system chart illustrating a configuration of a brake according to a first embodiment.

FIG. 1 schematically illustrates a configuration of a brake apparatus according to a first embodiment together with a hydraulic circuit. The brake apparatus 1 is a hydraulic brake apparatus applied to a brake system of an electric vehicle, such as a hybrid vehicle including an electric motor (a generator) besides an engine and an electric vehicle including only the electric motor (the generator), as a prime mover that drives wheels. Such an electric vehicle can carry out regenerative braking, which brakes the vehicle by converting a kinetic energy of the vehicle into electric energy with use of a regenerative braking apparatus including the motor (the generator). The brake apparatus 1 supplies brake fluid working as hydraulic fluid to a brake actuation unit mounted on each of wheels FL to RR of the vehicle to generate a brake hydraulic pressure (a wheel cylinder hydraulic pressure), thereby applying a hydraulic braking force to each of the wheels FL to RR.

The brake actuation unit including a wheel cylinder 8 is a so-called disk type brake device, and includes a brake disk and a caliper (a hydraulic brake caliper). The brake disk is a brake rotor that rotates integrally with a tire. The caliper is disposed with a predetermined clearance (a space, or a gap due to loose mounting) generated between the caliper and the brake disk, and includes a brake pad that generates the braking force by being displaced by the wheel cylinder hydraulic pressure into contact with the brake disk. The brake apparatus 1 includes two brake pipe systems (a primary P system and a secondary S system), and employs, for example, a so-called X-split pipe configuration. The brake apparatus 1 may employ another piping method, such as a front/rear split pipe configuration. Hereinafter, when a component provided in correspondence with the P system and a component provided in correspondence with the S system should be distinguished from each other, indices P and S will be added at the ends of the respective reference numerals.

The brake apparatus 1 includes a brake pedal 2, a reservoir tank (hereinafter referred to as a reservoir) 4, a master cylinder unit 5, and a pump unit 7. The brake pedal 2 serves as a brake operation member that receives an input of a brake operation performed by an operator (a driver). The reservoir 4 is a brake fluid source that stores the brake fluid, and is a low-pressure portion opened to an atmospheric pressure. The master cylinder unit 5 is connected to the brake pedal 2 and is replenished with the brake fluid from the reservoir 4, and generates a brake hydraulic pressure (a master cylinder pressure) by being actuated by the operation that the driver performs on the brake pedal 2. The pump unit 7 generates a hydraulic pressure by a motor M. The master cylinder unit 5 includes a master cylinder mechanism 50, a hydraulic control unit 60, and an electronic control unit (hereinafter referred to as an ECU) 100. The master cylinder mechanism 50 generates the master cylinder pressure by the operation performed on the brake pedal 2. The hydraulic control unit 60 receives a supply of the brake fluid from the reservoir 4 or the master cylinder mechanism 50, and includes a plurality of electromagnetic valves and the like for generating the brake hydraulic pressure independently of the brake operation performed by the driver. The ECU 100 controls actuation of this plurality of electromagnetic valves and the like, and the pump unit 7. Hereinafter, the various kinds of electromagnetic valves will be referred to as electromagnetic valves 20, when they are collectively referred to.

The brake apparatus 1 does not include an engine negative-pressure booster that boosts the brake operation force by utilizing an intake negative pressure generated by the engine of the vehicle. A push rod 30 is rotatably connected to the brake pedal 2. The master cylinder mechanism 50 is a tandem-type master cylinder, and includes a primary piston 54P connected to the push rod 30 and a secondary piston 54S configured as a free piston, as master cylinder pistons axially displaceable according to the brake operation performed by the driver. The primary piston 54P is provided with a stroke sensor 90 that detects the pedal stroke. The details of the stroke sensor 90 will be described below.

The hydraulic control unit 60 is mounted between the wheel cylinders 8 and the master cylinder mechanism 50, and can individually supply the master cylinder pressure or a control hydraulic pressure to each of the wheel cylinders 8. The hydraulic control unit 60 includes a plurality of control valves as actuators for generating the control hydraulic pressure. The electromagnetic valves and the like perform an opening/closing operation according to a control signal, thereby controlling a flow of the brake fluid. The hydraulic control unit 60 is provided so as to be able to increase the pressures in the wheel cylinders 8 with use of the hydraulic pressure generated by the pump unit 7 with the master cylinder mechanism 50 and the wheel cylinders 8 out of communication with each other, and includes a stroke simulator 27 that creates the pedal stroke by supply of the brake fluid from the master cylinder mechanism 50 according to the brake operation performed by the driver. Further, hydraulic sensors 91 to 93, which detect a discharge pressure of the pump unit 7 and the master cylinder pressure, are mounted in the master cylinder unit 5. The pump unit 7 is configured as a separate unit from the master cylinder unit 5, and is connected to the master cylinder unit 5 and the reservoir 4 via pipes (a connection pipe 10R, an intake pipe 12a, and a discharge pipe 13a). The pump unit 7 introduces therein the brake fluid in the reservoir 4 and discharges the brake fluid toward the wheel cylinders 8, by being rotationally driven by the motor M. In the present embodiment, the pump unit 7 is embodied by an external gear pump (hereinafter referred to as a gear pump 70), which is excellent in terms of a noise and vibration performance and the like. The pump unit 7 is used in common by both of the systems, and is driven by the same motor M. The motor M can be embodied by, for example, a brushed motor.

Detection values transmitted from the stroke sensor 90 and the hydraulic sensors 91 to 93 and information regarding a running state transmitted from the vehicle are input to the ECU 100, and the ECU 100 controls each of the actuators in the hydraulic control unit 60 based on a program installed therein. More specifically, the ECU 100 controls the opening/closing operations of the electromagnetic valves that switch communication states of oil passages, and the number of times of rotation of the motor M that drives the pump unit 7 (i.e., the discharge amount of the pump unit 7). By this operation, the ECU 100 realizes boosting control for reducing a required brake operation force, anti-lock brake control (hereinafter referred to as ABS) for preventing or reducing a slip of a wheel that might be caused when the vehicle is braked, brake control for controlling a motion of the vehicle (vehicle dynamics control such as electronic stability control, which will be hereinafter referred to as VDC), automatic brake control such as adaptive cruise control, regenerative brake control that controls the wheel cylinder hydraulic pressure so as to achieve a target deceleration (a target braking force) by collaborating with the regenerative brake, and the like. In the boosting control, the ECU 100 drives the hydraulic control unit 60 to create a higher wheel cylinder hydraulic pressure than the master cylinder pressure with use of the discharge pressure of the pump unit 7 as a hydraulic source, thereby generating a hydraulic braking force for compensating for insufficiency of the brake operation force input by the driver, when the driver performs the brake operation. This control allows the brake apparatus 1 to exert a boosting function that assists the brake operation. In other words, the ECU 100 is provided so as to allow the brake apparatus 1 to assist the brake operation force by actuating the hydraulic control unit 60 and the pump unit 7 instead of not including the engine negative-pressure booster. In the regenerative brake control, the ECU 100 generates a hydraulic braking force for compensating for insufficiency of a regenerative braking force generated by the regenerative braking apparatus insufficient to, for example, generate a braking force requested by the driver.

The master cylinder mechanism 50 is a first hydraulic source connected to the wheel cylinders 8 via first oil passages 11, which will be described below, and capable of increasing the wheel cylinder hydraulic pressures. The master cylinder mechanism 50 can increase the pressures in wheel cylinders 8a and 8d via an oil passage (a first oil passage 11P) in the P system with use of a master cylinder pressure generated in a first fluid chamber 51P, and can also increase the pressures in wheel cylinders 8b and 8c via a first oil passage 11S in the S system with use of a master cylinder pressure generated in a second fluid chamber 51S. The pistons 54P and 54S in the master cylinder mechanism 50 are inserted axially displaceably along an inner peripheral surface of a bottomed cylindrical cylinder. The cylinder includes a discharge port (a supply port) 501 and a replenishment port 502 for each of the P and S systems. The discharge port 501 is provided so as to be connectable to the hydraulic control unit 60 to establish communication with the wheel cylinders 8. The replenishment port 502 is connected to the reservoir 4 and is in communication with the reservoir 4. A coil spring 56P as a return spring is set in the first fluid chamber 51P between the pistons 54P and 54S in a pressed and compressed state. A coil spring 56S is set in the second fluid chamber 51S between the piston 54S and an axial end of the cylinder in a pressed and compressed state.

The discharge ports 501 are constantly opened to the first and second fluid chambers 51P and 51S.

In the following description, a brake hydraulic circuit of the master cylinder unit 5 will be described with reference to FIG. 1. Members corresponding to the individual wheels FL to RR will be distinguished from one another if necessary, by indices a to d added at the ends of reference numerals thereof, respectively. The hydraulic control unit 60 includes the first oil passages 11, normally opened shut-off valves 21, normally opened pressure-increase valves (hereinafter referred to as SOL/V INs) 22, an intake oil passage 12, a discharge oil passage 13, a check valve 130, a normally-opened communication valve 23P, a normally-closed communication valve 23S, a first pressure-reduction oil passage 14, a normally-closed pressure adjustment valve 24, second pressure-reduction oil passages 15, normally closed pressure-reduction valves 25, a first simulator oil passage 16, and a second simulator oil passage 17. The first oil passages 11 connect the discharge ports 501 (the first and second fluid chambers 51P and 51S) of the master cylinder mechanism 50 and the wheel cylinders 8 to each other. The shut-off valves 21 are provided in the first oil passages 11. The pressure-increase valves 22 are provided (in oil passages 11a to 11d) on wheel cylinders 8-side with respect to the shut-off valves 21 in the first oil passages 11 in correspondence with the wheels FL to RR, respectively. The intake oil passage 12 connects a fluid pool 12a provided at an intake portion of the pump unit 7 and the pressure-reduction oil passages 15, which will be described below, to each other. The discharge oil passage 13 connects portions in the first oil passages 11 between the shut-off valves 21 and the SOL/V INs 22, and a discharge portion 71 of the pump unit 7 to each other. The check valve 130 is provided in the discharge oil passage 13, and permits only a flow of the brake fluid from the discharge portion 71-side to the first oil passages 11-side. The communication valve 23P is provided in the discharge oil passage 13 connecting a downstream side of the check valve 130 and the first oil passage 11P in the P system to each other. The communication valve 23S is provided in a discharge oil passage 13S connecting the downstream side of the check valve 130 and the first oil passage 11S in the S system to each other. The first pressure-reduction oil passage 14 connects a portion in a discharge oil passage 13P between the check valve 130 and the communication valve 23P, and the intake oil passage 12. The pressure adjustment valve 24 serves as a first pressure-reduction valve provided in the first pressure-reduction oil passage 14. The second pressure-reduction oil passages 15 connect a portion of the first oil passages lion the wheel cylinders 8-side with respect to the SOL/V INs 22, and the intake oil passage 12 to each other. The pressure-reduction valves 25 serve as second pressure-reduction valves provided in the second pressure-reduction oil passages 15. The first simulator oil passage 16 serves as a branch oil passage branching off from the master cylinder side of the shut-off valve 21P in the first oil passage 11P to be connected to a main chamber R1 of the stroke simulator 27. The second simulator oil passage 17 connects an auxiliary chamber (a backpressure chamber) R2 of the stroke simulator 27, and the intake oil passage 12 and the discharge oil passage 13 to each other via a stroke simulator IN valve 31 and a stroke simulator OUT valve 32.

In the pump unit 7, the fluid pool 12a is provided at a portion where the connection pipe 10R extending from the reservoir 4 is connected to the intake oil passage 12 of the pump unit 7. The discharge oil passages 13P and 13S form communication passages connecting the first oil passage 11P in the P system and the first oil passage 11S in the S system to each other. The pump unit 7 is connected to the wheel cylinders 8a to 8d via the above-described communication passages (the discharge oil passages 13P and 13S) and the first oil passages 11P and 11S, and serves as a second hydraulic source capable of increasing the wheel cylinder hydraulic pressures by discharging the brake fluid to the above-described communication passages (the discharge oil passages 13P and 13S). At least one of the shut-off valves 21, the SOL/V INs 22, the communication valve 23P, the pressure adjustment valve 24, and the pressure-reduction valves 25 of each of the systems (the SOL/V 22 and the pressure adjustment valve 24 in the present embodiment) is a proportional control valve, an opening degree of which is adjusted according to a current supplied to a solenoid. The other valves are ON/OFF valves, opening/closing of which is controlled to be switched between two values, i.e., switched to be either opened or closed. The above-described other valves can also be embodied by the proportional control valve.

The shut-off valves 21 are provided in the first oil passages 11P and 11S between the wheel cylinders 8 and a stroke simulator valve 26. Further, bypass oil passages 120 are provided in parallel with the first oil passages 11 by bypassing the SOL/V INs 22. Check valves 220 are provided in the bypass oil passages 120. The check valves 220 permit only a flow of the brake fluid from the wheel cylinders 8-side to the master cylinder 5-side. The hydraulic sensor 91 is provided in the first simulator oil passage 16. The hydraulic sensor 91 detects a hydraulic pressure at this portion (a hydraulic pressure in the stroke simulator 27, and corresponds to the master cylinder pressure). The hydraulic sensors 92 are provided between the shut-off valves 21 and the SOL/V INs 22 in the first oil passages 11. The hydraulic sensors 92 detect hydraulic pressures at these portions (the wheel cylinder hydraulic pressures). The hydraulic sensor 93 is provided between the check valve 130 and the communication valve 23 in the discharge oil passage 13P. The hydraulic sensor 93 detects a hydraulic pressure at this portion (the discharge pressure of the pump).

The stroke simulator 27 includes a piston 27a, a first spring 27b1, a retainer member 27b2, and a second spring 27b3. The piston 27a is disposed axially displaceably in a chamber R while dividing an inside of the chamber R into two chambers (the main chamber R1 and the auxiliary chamber R2). The spring 27b1 is an elastic member mounted in the auxiliary chamber R2 in a pressed and compressed state, and constantly biasing the piston 27a toward the main chamber R1-side (in a direction for reducing a volume of the main chamber R1 and increasing a volume of the auxiliary chamber R2). The retainer member 27b2 retains the first spring 27b1. The second spring 27b3 is an elastic member constantly biasing the retainer member 27b2 toward the main chamber R1-side. A first damper 27d1 and a second damper 27d2 are provided inside the retainer member 27b2 and at a plug member 27c, respectively, for the purpose of improving a pedal feeling (refer to FIG. 8). Hereinafter, the first spring 27b1 and the second spring 27b3 will be collectively referred to as the springs 27b. When the stroke simulator IN valve 31 and the stroke simulator OUT valve 32 are controlled in an opening direction and a closing direction, respectively, with the shut-off valves 21 controlled in opening directions, the brake system (the first oil passages 11) connecting the first and second fluid chambers 51P and 51S of the master cylinder 5 and the wheel cylinders 8 to each other creates the wheel cylinder hydraulic pressures by the master cylinder pressure generated with use of the force of pressing the pedal, thereby realizing pressing force brake (non-boosting control). On the other hand, when the stroke simulator valve IN valve 31 and the stroke simulator OUT valve 32 are controlled in a closing direction and an opening direction, respectively, with the shut-off valves controlled in closing directions, the brake system (the intake oil passage 12, the discharge oil passage 13, and the like) connecting the reservoir 4 and the wheel cylinders 8 to each other forms a so-called brake-by-wire system that creates the wheel cylinder hydraulic pressures by the hydraulic pressure generated with use of the pump unit 7, thereby realizing the boosting control, the regenerative cooperative control, and the like.

When the shut-off valves 21 are controlled in the closing directions to block the communication between the master cylinder 5 and the wheel cylinders 8, at least the brake fluid flowing out from the master cylinder mechanism 50 (the first fluid chamber 51P) into the first oil passage 11P is introduced into the main chamber R1 via the first simulator oil passage 16, by which the stroke simulator 27 creates the pedal stroke. When the driver performs the brake operation (presses or release the pressing of the brake pedal 2) with the shut-off valve 21P closed to block the communication between the master cylinder mechanism 50 and the wheel cylinders 8, and the stroke simulator OUT valve 32 opened to establish the communication between the master cylinder mechanism 50 and the stroke simulator 27, the stroke simulator 27 introduces and discharges the brake fluid from the master cylinder 5, thereby creating the pedal stroke. More specifically, when a hydraulic pressure (the master cylinder pressure) equal to or higher than a predetermined pressure is applied to a pressure-receiving surface of the piston 27a in the main chamber R1, the piston 27a is axially displaced toward the auxiliary chamber R2-side while pressing and compressing the spring 27b, thereby increasing the volume of the main chamber R1. As a result, the brake fluid is delivered from the master cylinder 5 (the discharge port 501P) into the main chamber R1 via the oil passages (the first oil passage 11P and the first simulator oil passage 16), and is also discharged from the auxiliary chamber R2 into the intake oil passage 12 via the second simulator oil passage 17. When the pressure in the main chamber R reduces to fall below the predetermined pressure, the piston 27a is returned to an initial position due to the biasing force (an elastic force) of the spring 27b. The stroke simulator 27 introduces therein the brake fluid from the master cylinder 5 in this manner, thereby simulating hydraulic stiffness of the wheel cylinders 8 to imitate a feeling that the driver would have when pressing the pedal.

The ECU 100 forms a hydraulic control unit that actuates the pump unit 7, the electromagnetic valves, and the like based on various kinds of information to control the hydraulic pressures in the wheel cylinders 8. The ECU 100 includes a brake operation amount detection unit 101, a target wheel cylinder hydraulic pressure calculation unit 102, a pressing force brake creation unit 103, a boosting control unit 104, a boosting control switching unit 105, a supplementary pressure increase unit, and the like. The brake operation amount detection unit 101 detects a displacement amount (the pedal stroke) of the brake pedal 2 as the brake operation amount upon receiving the input of the value detected by the stroke sensor 90. The target wheel cylinder hydraulic pressure calculation unit 102 calculates a target wheel cylinder hydraulic pressure. More specifically, the target wheel cylinder hydraulic pressure calculation unit 102 calculates, based on the detected pedal stroke, the target wheel cylinder hydraulic pressure that realizes a predetermined boosting rate, i.e., an ideal characteristic about a relationship between the pedal stroke and a brake hydraulic pressure requested by the driver (a vehicle deceleration G requested by the driver). Further, in the regenerative brake control, the target wheel cylinder hydraulic pressure calculation unit 102 calculates the target wheel cylinder hydraulic pressure in relation to the regenerative braking force. More specifically, the target wheel cylinder hydraulic pressure calculation unit 102 calculates such a target wheel cylinder hydraulic pressure that a sum of the regenerative braking force input from a control unit of the regenerative braking apparatus and a hydraulic braking force corresponding to the target wheel cylinder hydraulic pressure can satisfy the vehicle deceleration requested by the driver. In the VDC, the target wheel cylinder hydraulic pressure calculation unit 102 calculates the target wheel cylinder hydraulic pressure for each of the wheels FL to RR so as to, for example, realize a desired state of a vehicle motion based on a detected amount of the state of the vehicle motion (a lateral acceleration or the like).

The pressing force brake creation unit 103 is configured to prohibit the stroke simulator 27 from functioning by controlling the shut-off valves 21, the stroke simulator IN valve 31, and the stroke simulator OUT valve 32 in the opening directions, the opening direction, and the closing direction, respectively, thereby realizing the pressing force brake that creates the wheel cylinder hydraulic pressures from the master cylinder pressure. The boosting control unit 104 controls the shut-off valves 21 in the closing directions to thus make the hydraulic control unit 60 ready for the creation of the wheel cylinder hydraulic pressures by the pump unit 7, thereby performing the boosting control. The boosting control unit 104 controls each of the actuators of the hydraulic control unit 60 to realize the target wheel cylinder hydraulic pressures. Further, the boosting control unit 104 closes the stroke simulator IN valve 31 and controls the stroke simulator OUT valve 32 in the opening direction, thereby activating the stroke simulator 27. The boosting control switching unit 105 controls the operation of the master cylinder unit 5 to switch the pressing force brake and the boosting control, based on the calculated target wheel cylinder hydraulic pressure. More specifically, upon detection of a start of the brake operation by the brake operation amount detection unit 101, the boosting control switching unit 105 causes the pressing force brake creation unit 103 to create the wheel cylinder hydraulic pressures if the calculated target wheel cylinder hydraulic pressure is equal to or lower than a predetermined value (for example, corresponding to a maximum value of the vehicle deceleration G that would be generated when the vehicle is normally braked without being suddenly braked). On the other hand, the boosting control switching unit 105 causes the boosting control unit 104 to create the wheel cylinder hydraulic pressures if the target wheel cylinder hydraulic pressure calculated at the time of the operation of pressing the brake exceeds the above-described predetermined value.

Figure 2:
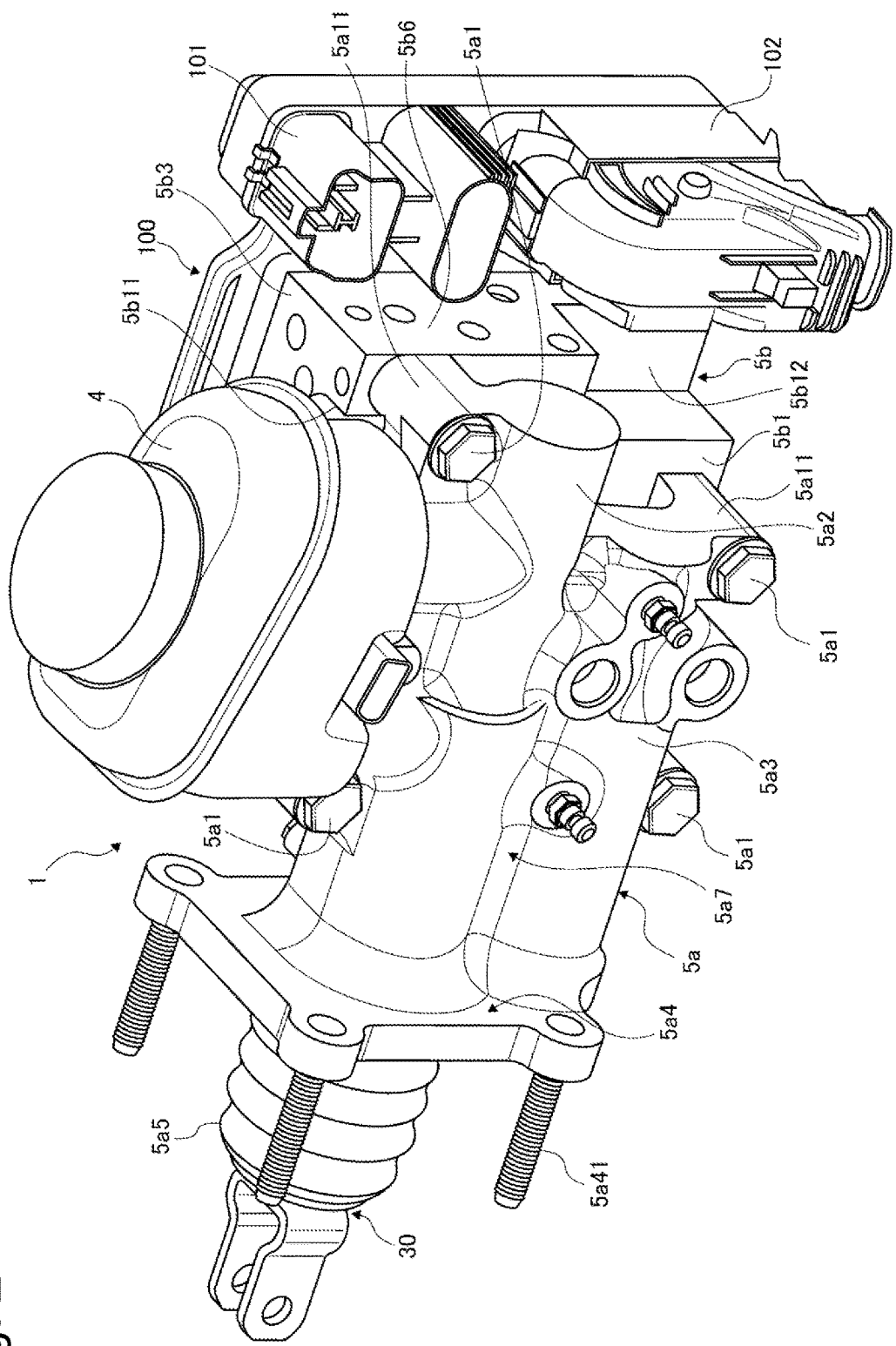
FIG. 2 is a perspective view illustrating a brake apparatus according to the first embodiment.
Figure 3:
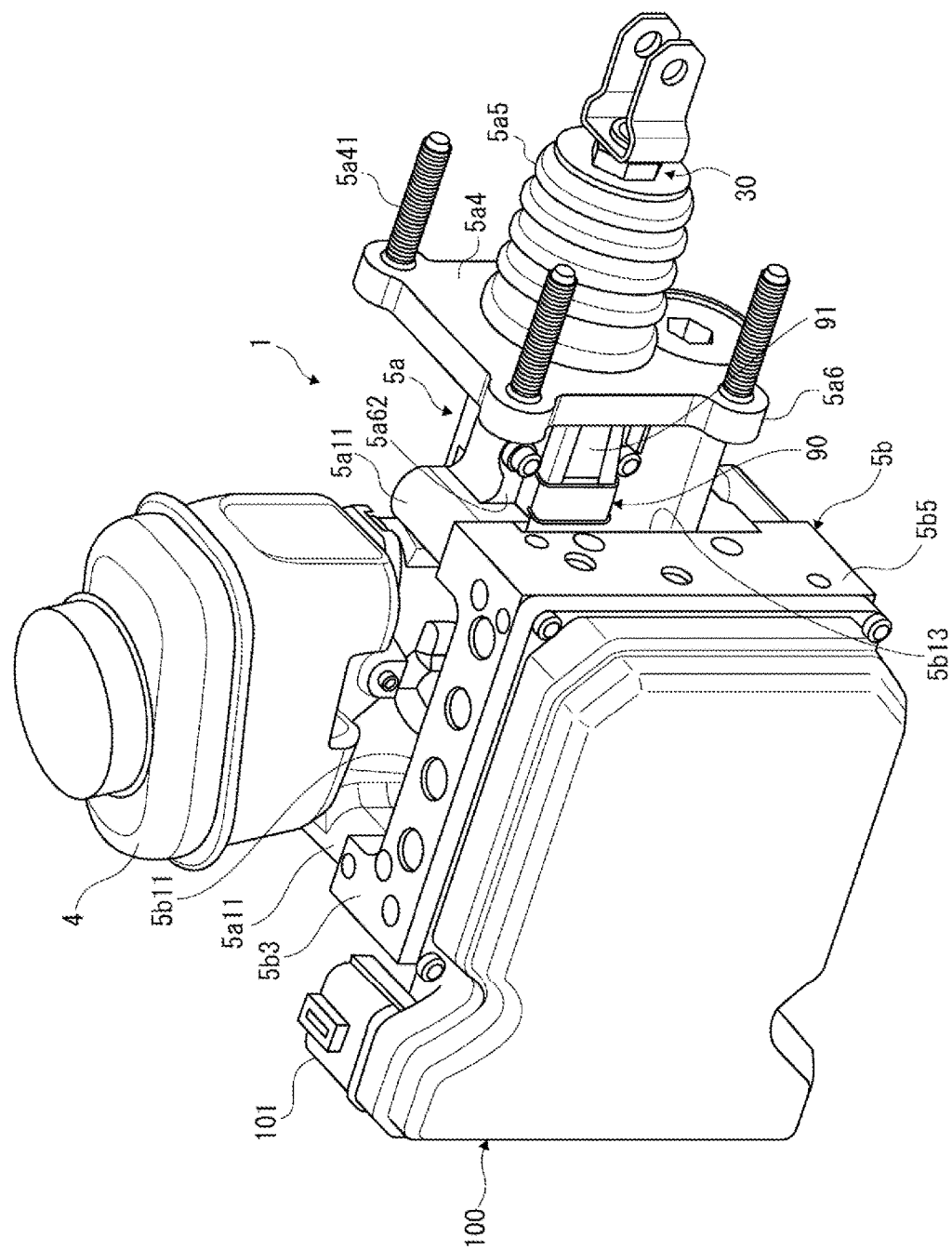
FIG. 3 is a perspective view illustrating the brake apparatus according to the first embodiment.
Figure 4:
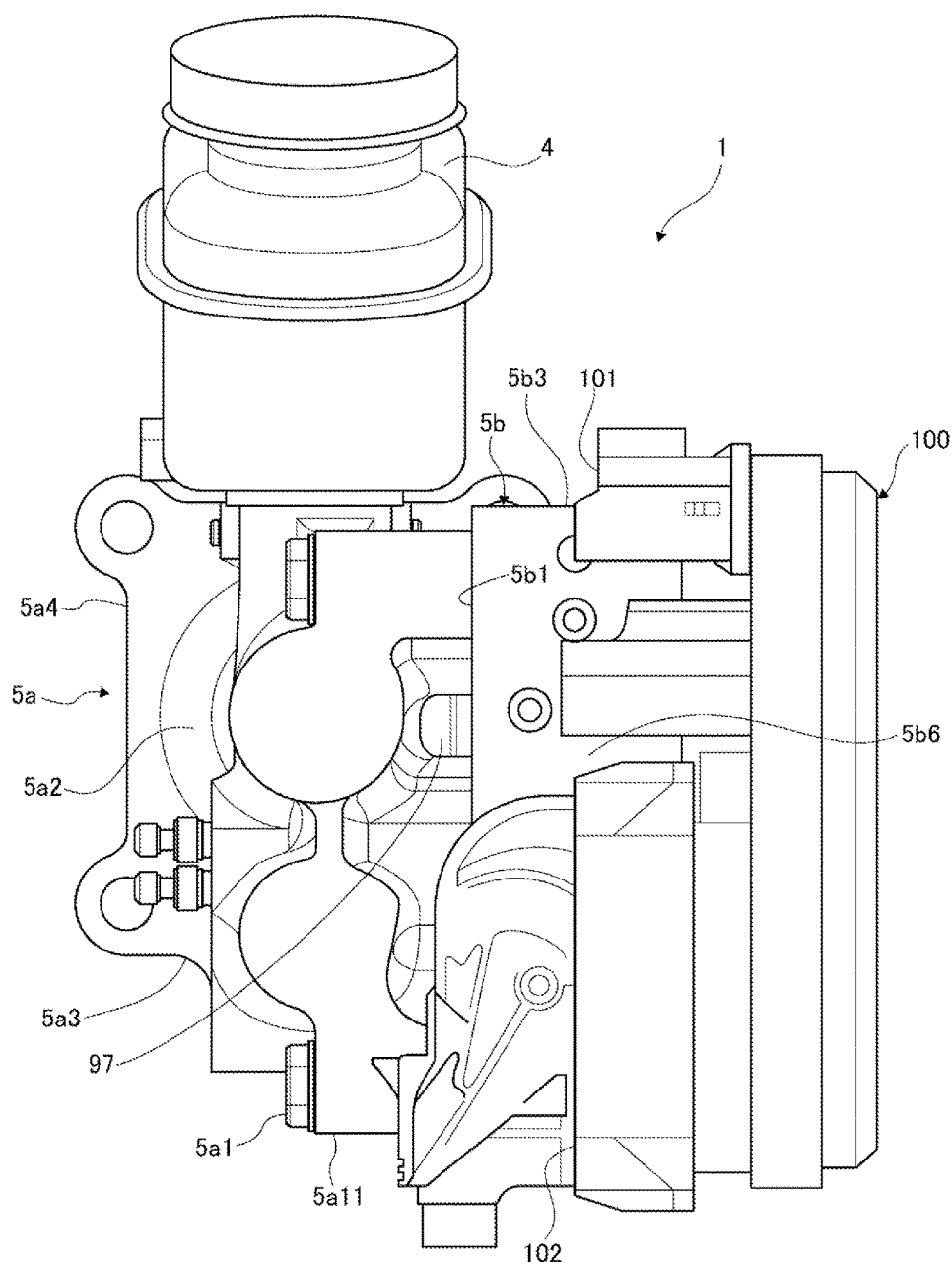
FIG. 4 is a front view illustrating the brake apparatus according to the first embodiment.
Figure 5:
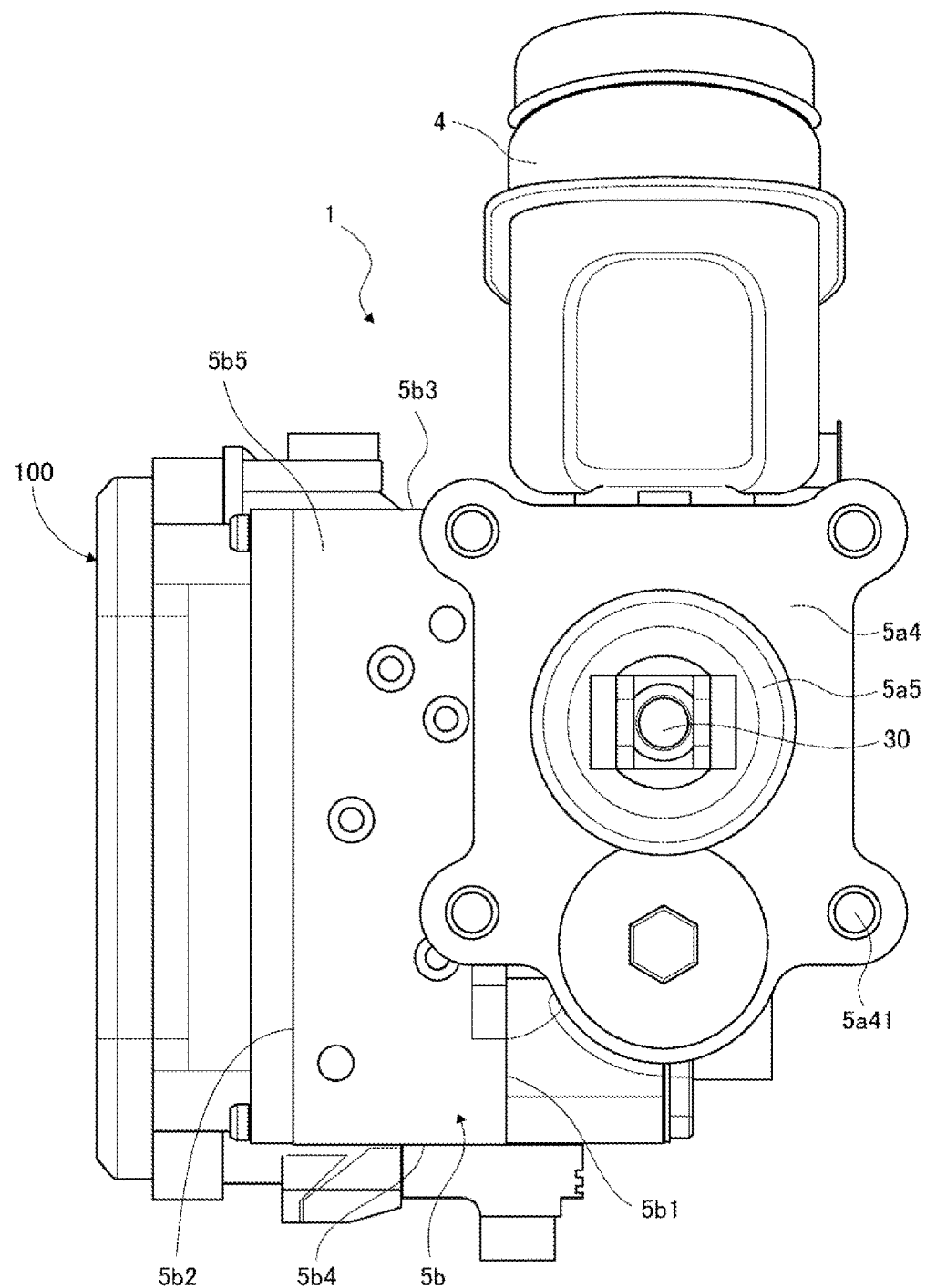
FIG. 5 is a back view illustrating the brake apparatus according to the first embodiment.
Figure 6:
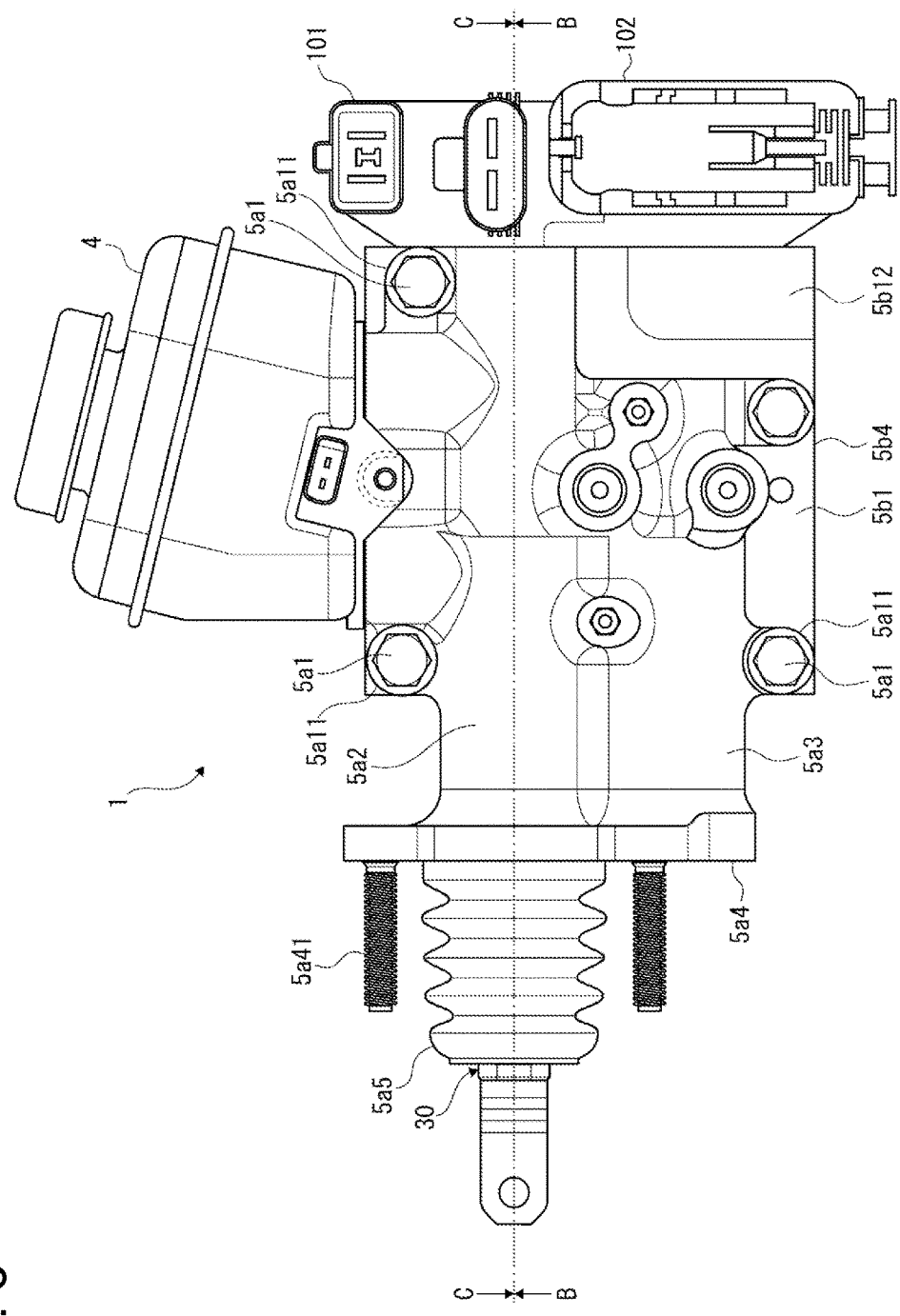
FIG. 6 is a left side view illustrating the brake apparatus according to the first embodiment.
Figure 7:
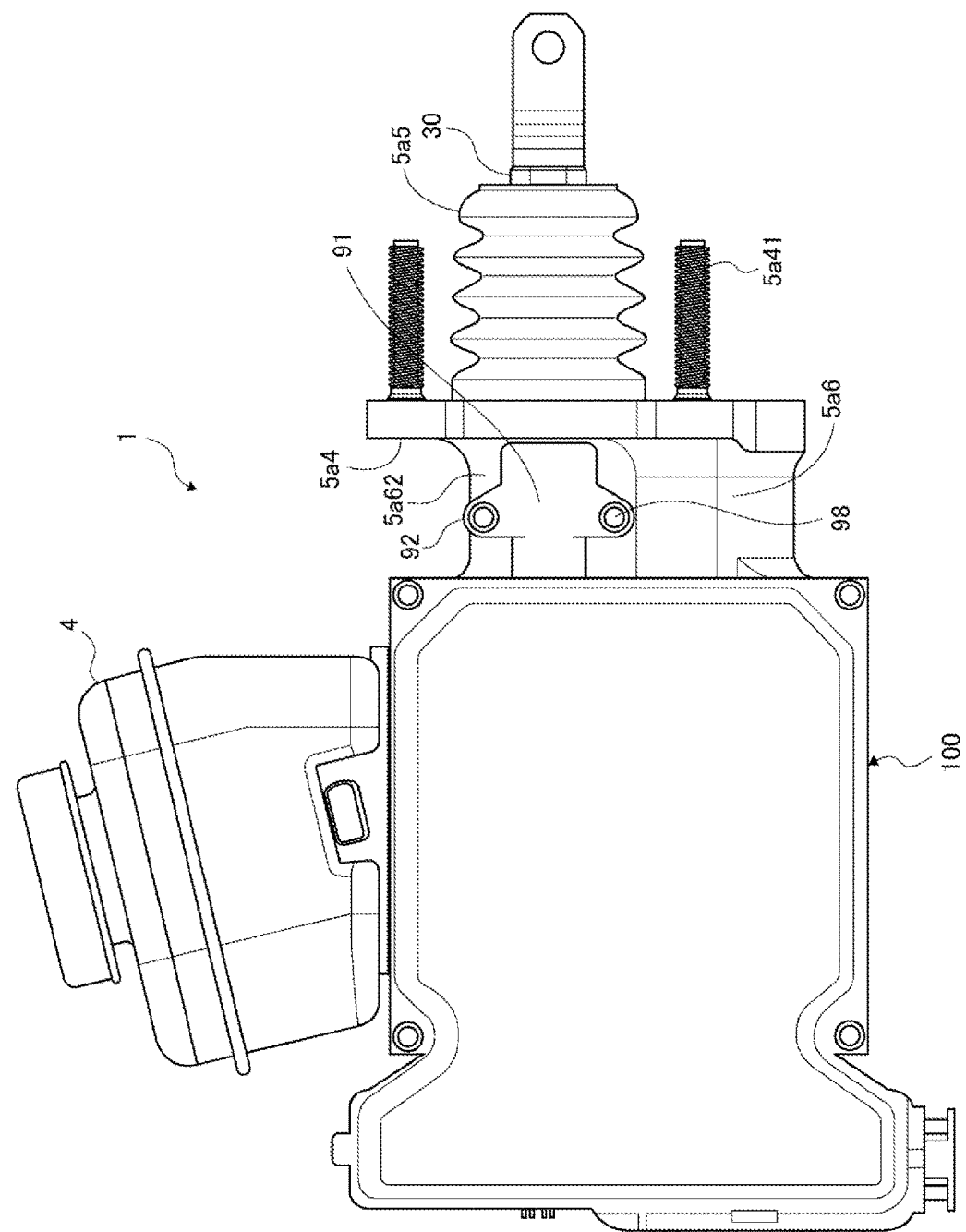
FIG. 7 is a right side view illustrating the brake apparatus according to the first embodiment.
Figure 8:
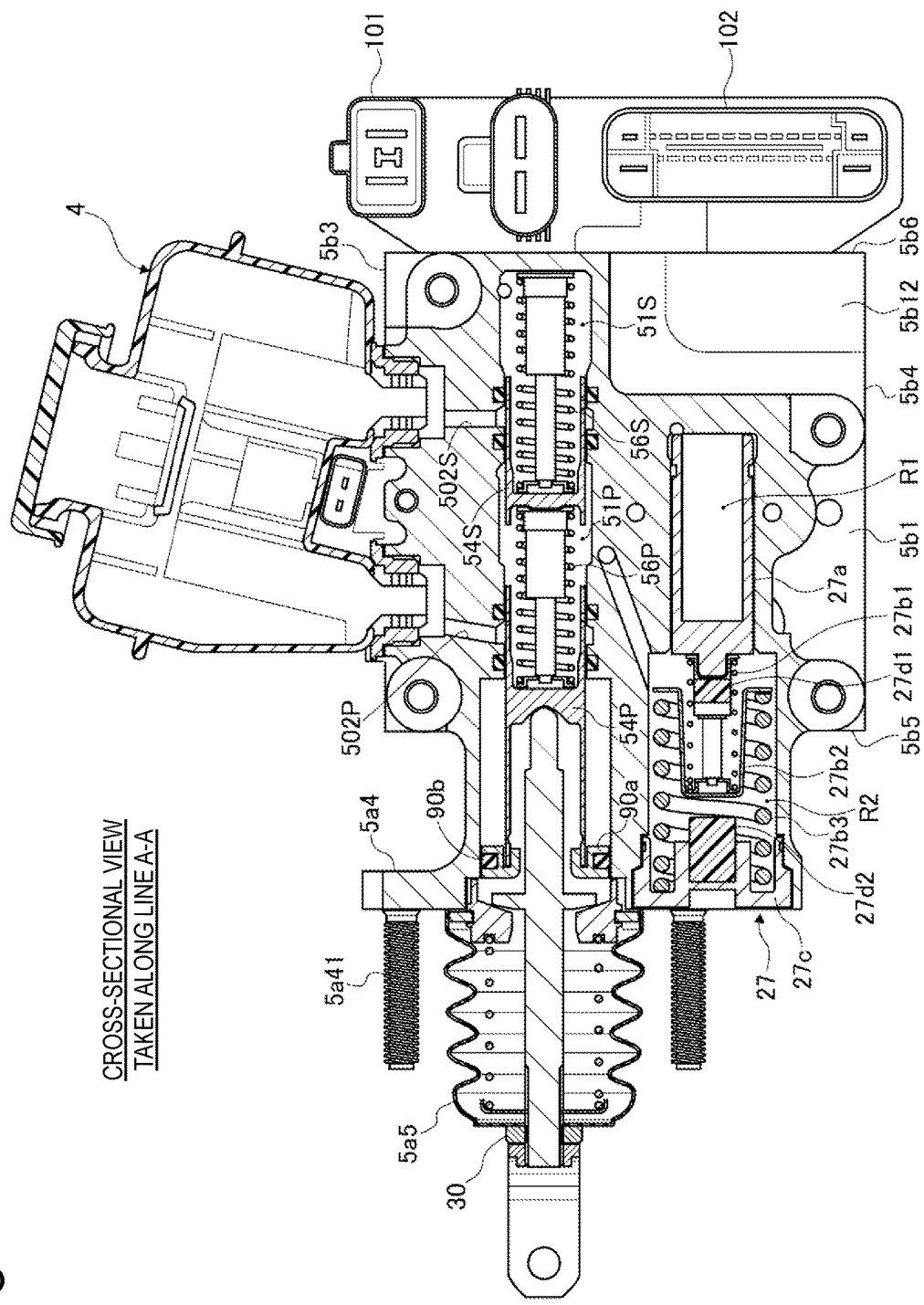
FIG. 8 is a cross-sectional view illustrating the brake apparatus according to the first embodiment taken along a line A-A.
Figure 9:
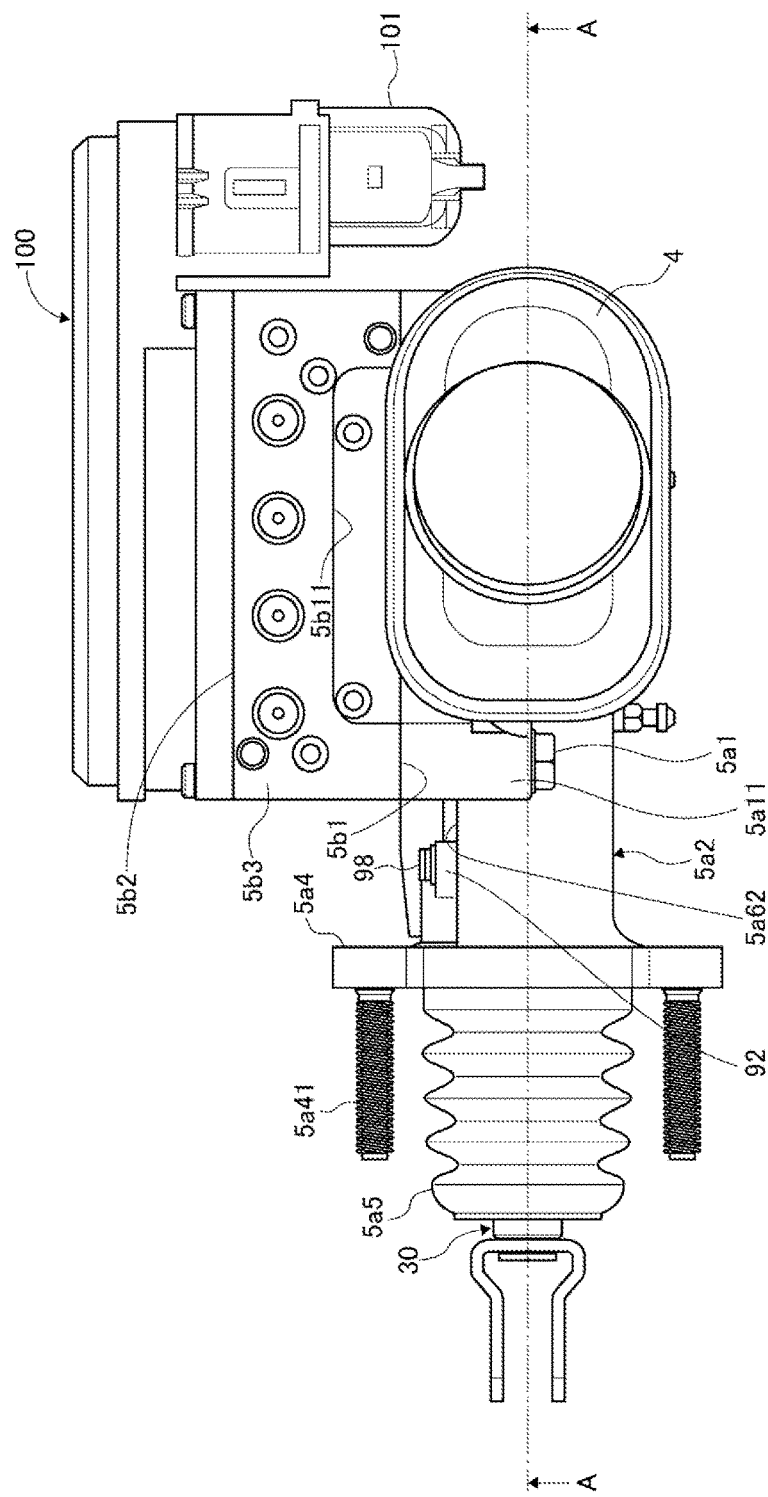
FIG. 9 is a plan view illustrating the brake apparatus according to the first embodiment.
Figure 10:
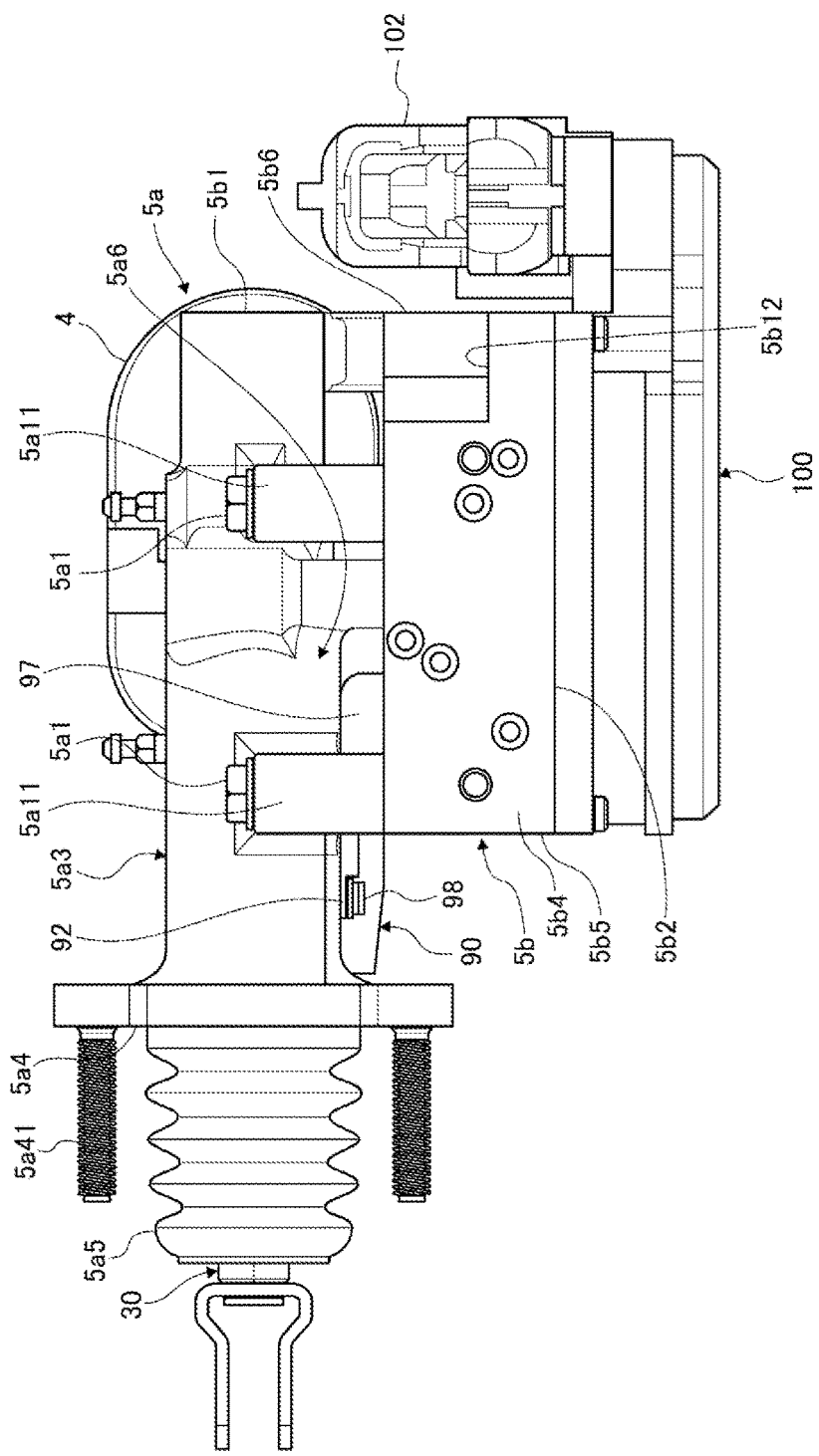
FIG. 10 is a bottom view illustrating the brake apparatus according to the first embodiment.
Figure 11:
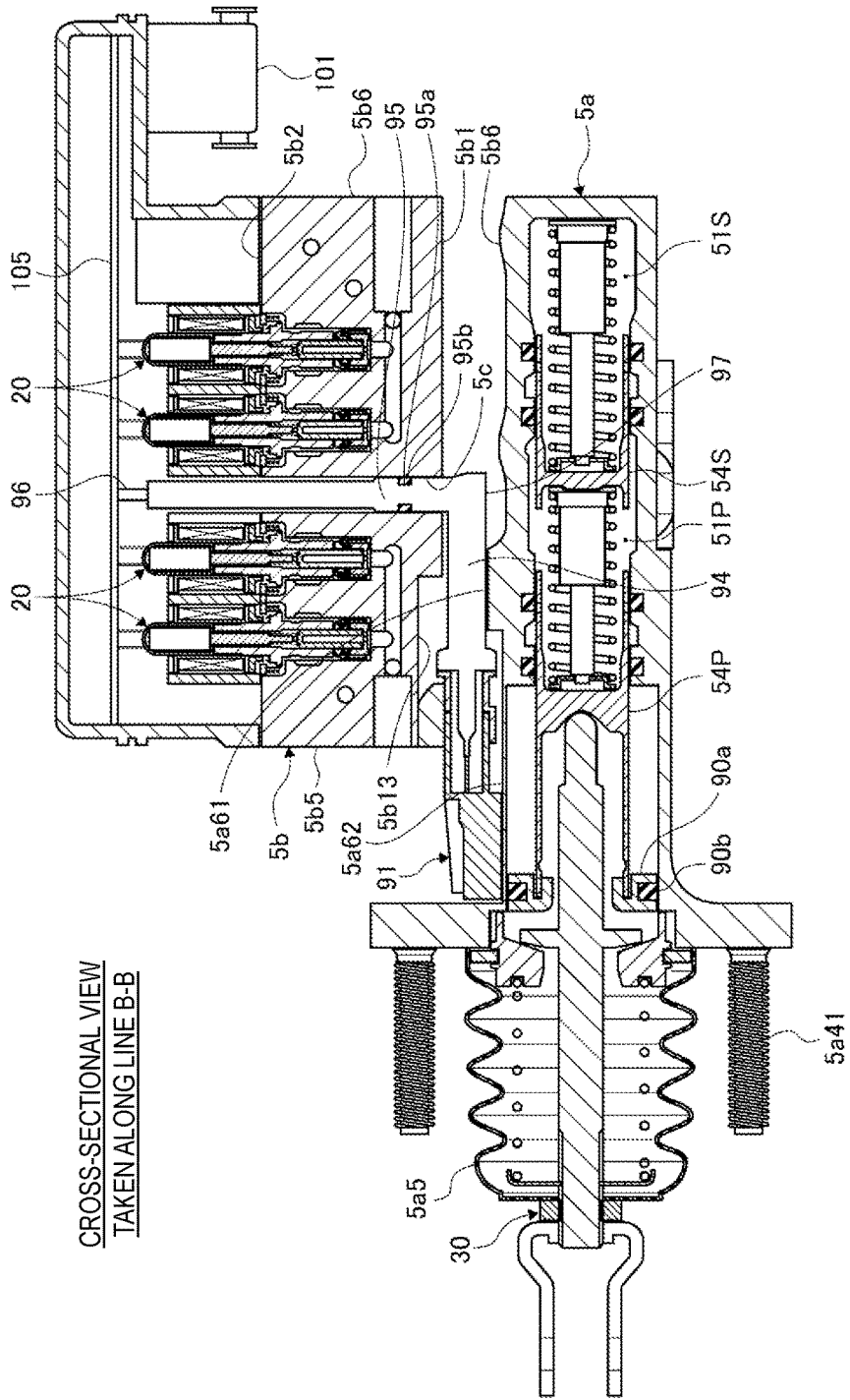
FIG. 11 is a cross-sectional view illustrating the brake apparatus according to the first embodiment taken along a line B-B.
Figure 12:
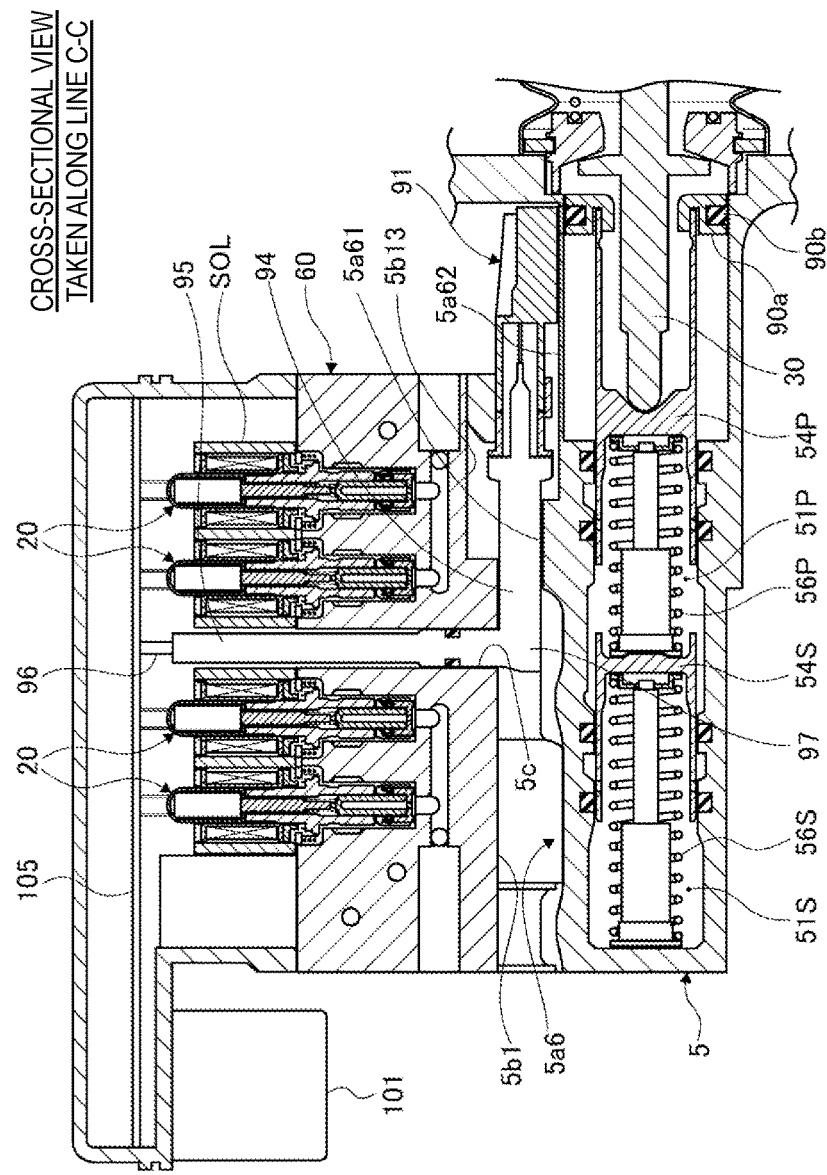
FIG. 12 is a cross-sectional view illustrating the brake apparatus according to the first embodiment taken along a line C-C.
Figure 13:
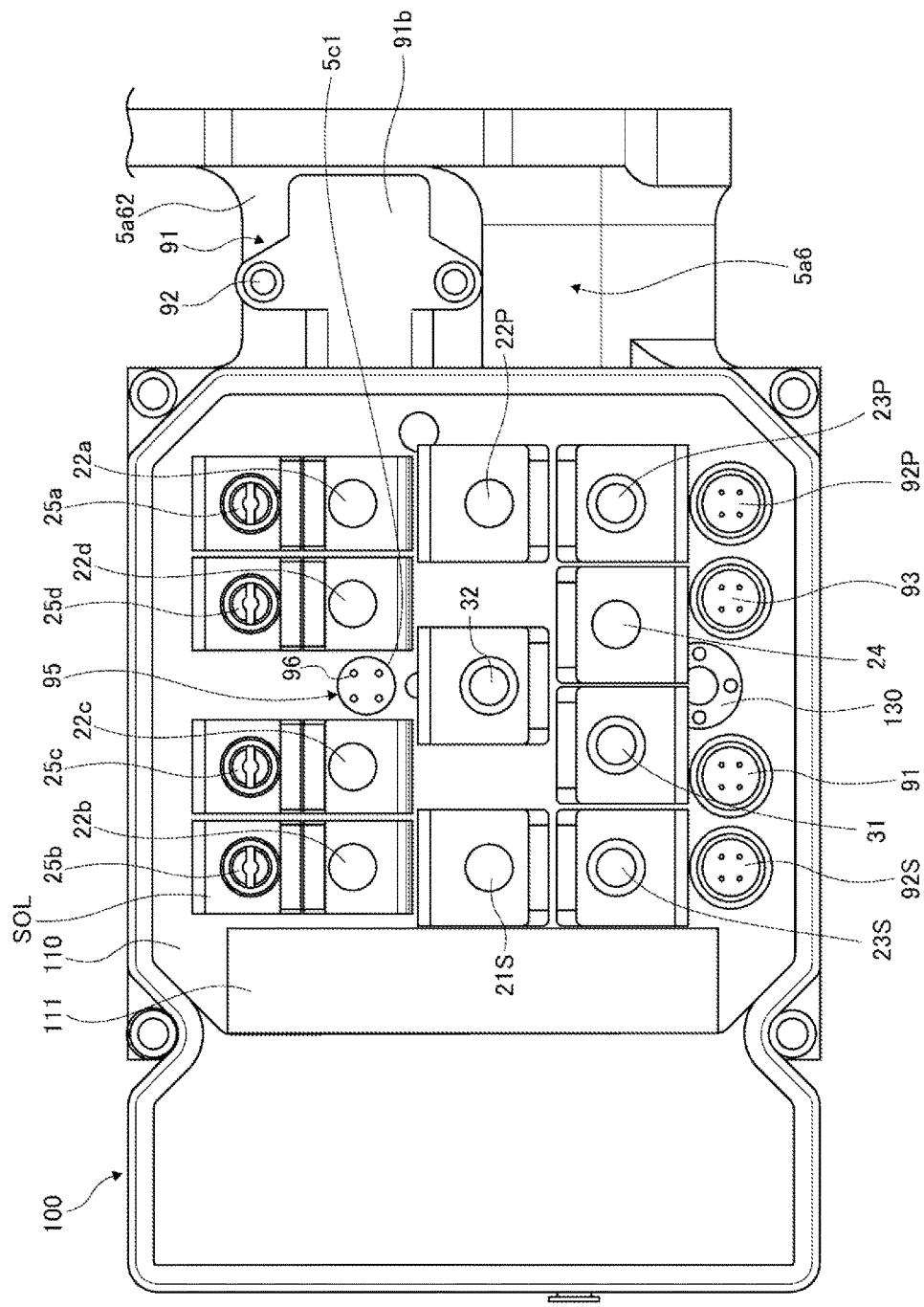
FIG. 13 illustrates an internal layout of an ECU provided to the brake apparatus according to the first embodiment.
Figure 14:
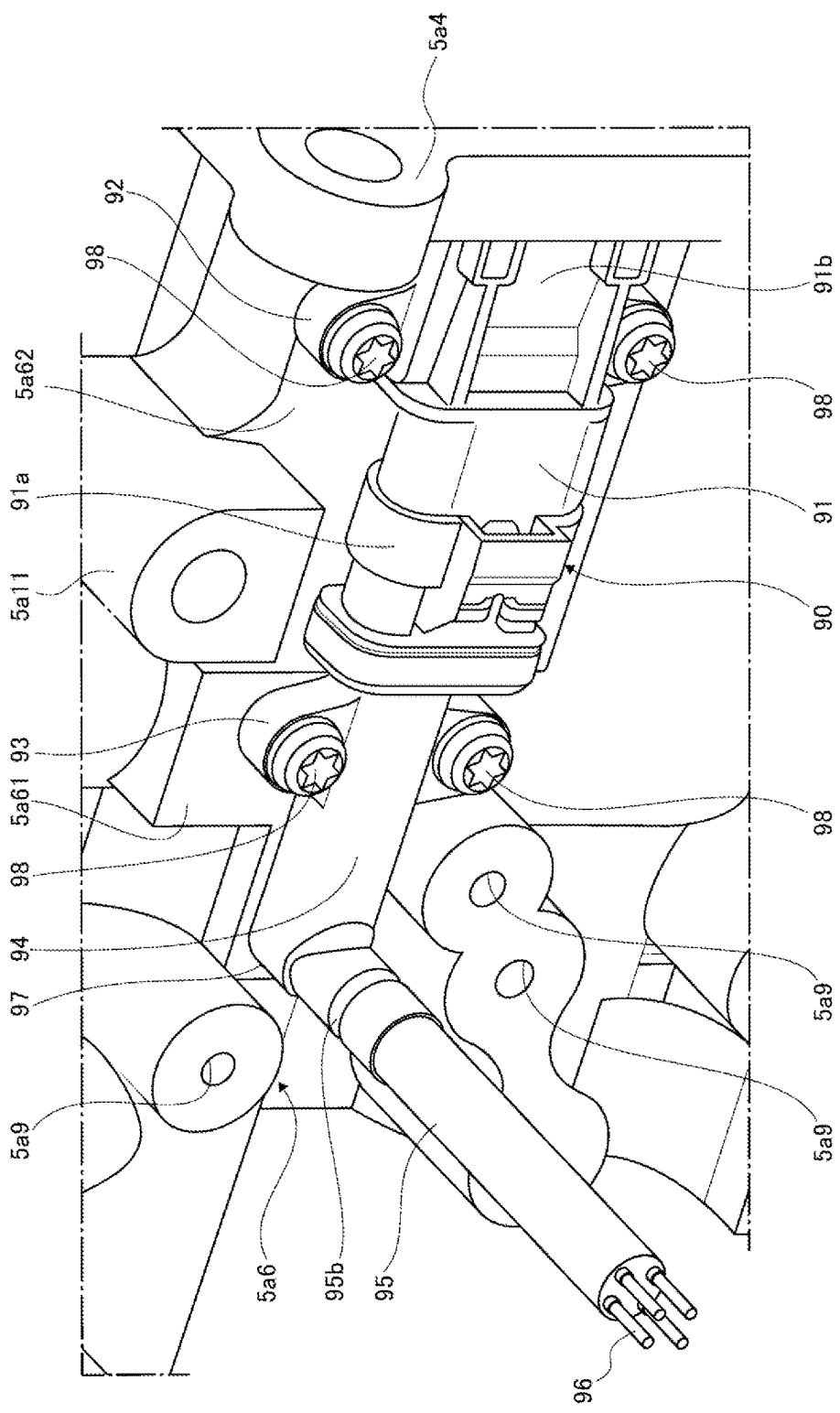
FIG. 14 is a partial enlarged perspective view of a stroke sensor provided to the brake apparatus according to the first embodiment.
Figure 15:
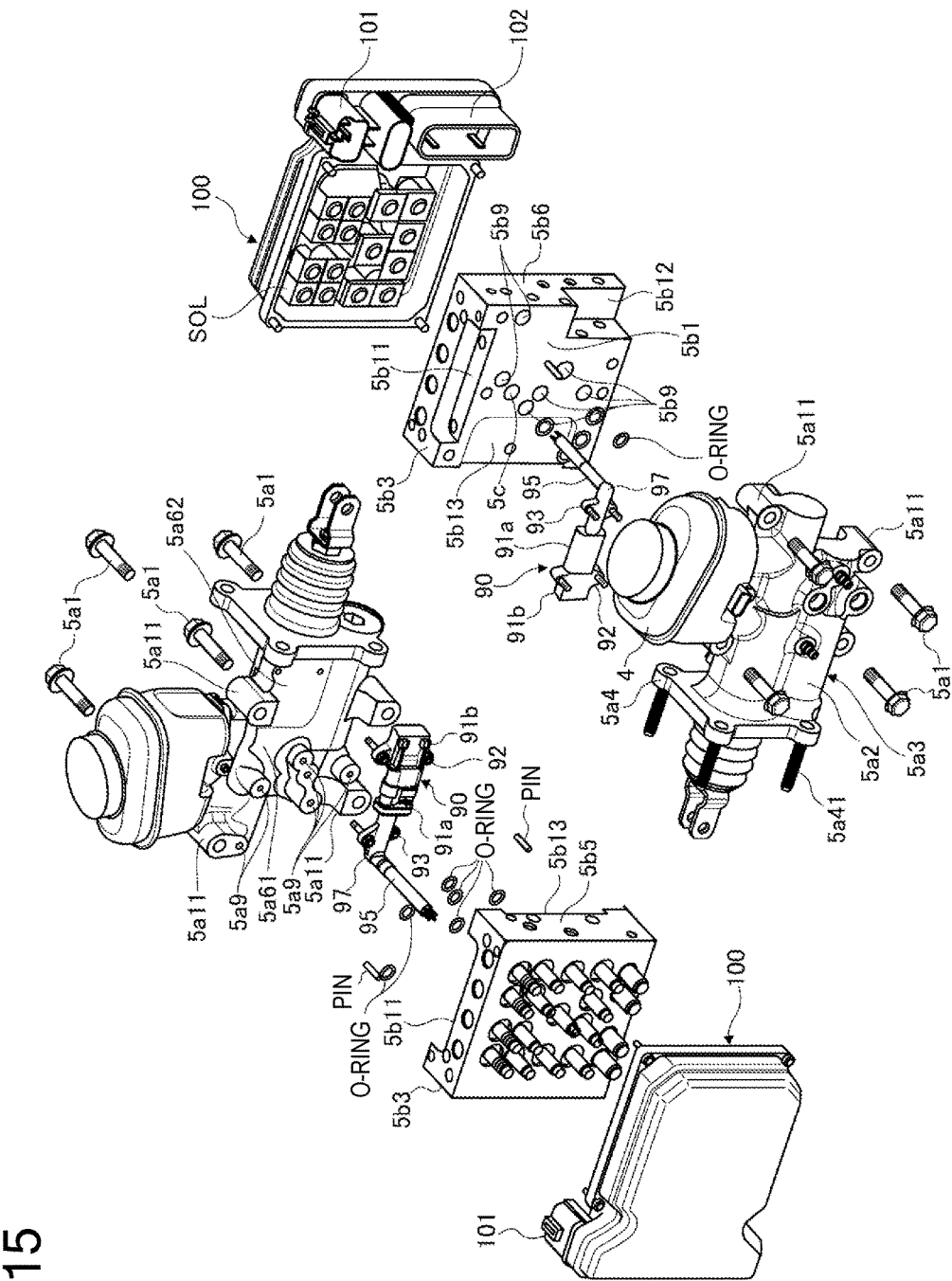
FIG. 15 is an exploded perspective view illustrating the brake apparatus according to the first embodiment.

FIGS. 2 and 3 are perspective views illustrating the brake apparatus according to the first embodiment. FIG. 4 is a front view illustrating the brake apparatus according to the first embodiment. FIG. 5 is a back view illustrating the brake apparatus according to the first embodiment. FIG. 6 is a left side view illustrating the brake apparatus according to the first embodiment. FIG. 7 is a right side view illustrating the brake apparatus according to the first embodiment. FIG. 8 is a cross-sectional view illustrating the brake apparatus according to the first embodiment taken along a line A-A. FIG. 9 is a plan view illustrating the brake apparatus according to the first embodiment. FIG. 10 is a bottom view illustrating the brake apparatus according to the first embodiment. FIG. 11 is a cross-sectional view illustrating the brake apparatus according to the first embodiment taken along a line B-B. FIG. 12 is a cross-sectional view illustrating the brake apparatus according to the first embodiment taken along a line C-C. FIG. 13 illustrates an internal layout of the ECU provided to the brake apparatus according to the first embodiment. FIG. 14 is a partial enlarged perspective view of the stroke sensor provided to the brake apparatus according to the first embodiment. FIG. 15 is an exploded perspective view illustrating the brake apparatus according to the first embodiment. The pump unit 7 is mounted at a predetermined position on a vehicle body side. In the first embodiment, the position where the pump unit 7 is mounted is not especially specified. Examples of the position where the pump unit 7 is mountable include a position below the brake apparatus in a vertical direction of the vehicle in an engine room, and another efficiently usable space. The mounted pump unit 7 is connected to the brake apparatus via a pipe and/or a wiring.

The master cylinder unit 5 of the brake apparatus 1 includes a first unit housing 5a, a second unit housing 5b, and the ECU 100. The first unit housing 5a contains the master cylinder mechanism 50 and the stroke simulator 27 therein. The second unit housing 5b contains the various kinds of electromagnetic valves 20, the hydraulic sensors, and the like therein, and also includes a plurality of oil passages formed by piercing the second unit housing 5b. The ECU 100 is used to output a control instruction signal calculated based on various kinds of sensor signals and the like to the various kinds of electromagnetic valves 20. The first unit housing 5a includes a first side surface 5a6 and a second side surface 5a7. The first side surface 5a6 faces the second unit housing 5b. The first side surface 5a6 has a shape generally cylindrically bulging toward the second unit housing 5b-side, and a flat surface cut out flatly. The second side surface 5a7 is located opposite from the first side surface 5a6, and has a plurality of shapes generally cylindrically bulging toward an opposite side from the second unit housing 5b-side. A master cylinder container portion 5a2 and a stroke simulator container portion 5a3 are formed in the first unit housing 5a. The master cylinder container portion 5a2 contains the master cylinder mechanism 50 therein. The stroke simulator container portion 5a3 contains the stroke simulator 27 therein.

As illustrated in the cross-sectional view of FIG. 8 taken along the line A-A, the stroke simulator 27 is contained in a cylinder portion formed in the first unit housing 5a by piercing the first unit housing 5a, and this cylinder portion is sealingly closed by the plug member 27c. Further, a flange portion 5a4 is formed on one side of the first unit housing 5a that is closer to the push rod 30. The brake apparatus 1 is mounted onto an installment panel of the vehicle by mounting bolts 5a41 provided at four corners of the flange portion 5a4. A rubber boot 5a5 is disposed around an outer periphery of the push rod 30. The rubber boot 5a5 prevents entry of dust and the like. Further, the reservoir 4 is mounted on the first unit housing 5a. The first unit housing 5a includes first flange portions 5a11 for fixing the first unit housing 5a and the second unit housing 5b with use of fixation bolts 5a1. In the first embodiment, the first unit housing 5a includes the flange portion 5a11 at four positions.

A flat surface portion 5a61 (a recessed portion), which is obtained by flatly cutting out the generally cylindrically bulging portion, is formed on the first side surface 5a6-side and the flange portion 5a4-side of the master cylinder container portion 5a2. A flat sensor attachment surface 5a62 (a wall with a recessed portion formed thereon), which is a recessed portion obtained by further deeply cutting out, is formed on this flat surface portion 5a61. The stroke sensor 90 is attached on this sensor attachment surface 5a62 and the flat surface portion 5a61. Now, referring to the cross-sectional view of FIG. 11 taken along the line B-B and the cross-sectional view of FIG. 12 taken along the line C-C, in the master cylinder mechanism 50 according to the first embodiment, a holder member 90a is attached to the primary piston 54P connected to the push rod 30. A permanent magnet 90b is held around an outer periphery of this holder member 90a. This permanent magnet 90b carries out a stroke while having a predetermined correlation with the pedal stroke amount of the brake pedal 2. A Hall element is contained in the stroke sensor 90, and the stroke sensor 90 detects the stroke amount by detecting a change in a magnetic flux due to the stroke of this permanent magnet 90b with use of the Hall element. It is preferable to position the stroke sensor 90 and the permanent magnet 90b as close to each other as possible to highly accurately detect the change in the magnetic flux. Therefore, the flat surface portion 5a61 and the sensor attachment surface 5a62 are formed by cutting out an outer surface of the master cylinder container portion 5a2 to thereby reduce a distance between the stroke sensor 90 and the permanent magnet 90b.

FIG. 14 is the perspective view illustrating the stroke sensor according to the first embodiment in an attached state. The stroke sensor 90 includes a detection portion 91, a first pipe 94 (an extension portion), a second pipe 95 (a connection end), and a connection terminal 96. The detection portion 91 contains the Hall element therein. The first pipe 94 contains therein a bus bar (a wiring made of a plate-shaped metallic piece), which is a wiring for transmitting an electric signal detected by the detection portion 91. The second pipe 95 is generally vertically erected from the first pipe 94 at an end 97 of the first pipe 94. The connection terminal 96 is provided at a tip of the second pipe 95 and is inserted in a terminal hole of a substrate, which will be described below. The first pipe 94 and the second pipe 95 (a surrounding portion) are each made from a stiffer resin material than the bus bar, and surround the bus bar. A ring groove 95a is formed at a portion to be inserted into a through-hole 5c of the second unit housing 5b on an outer periphery of the second pipe 95. An O-ring 95b is set in the ring groove 95a, thereby liquid-tightly defining the first attachment surface 5b1-side and the second attachment surface 5b2-side of the second unit housing 5b, respectively. The detection portion 91 includes a terminal collection portion 91a generally oval in cross-section, and a sensor portion 91b generally rectangular in cross-section. The terminal collection portion 91a is slightly spaced apart from the sensor attachment surface 5a62. The sensor portion 91b is in close contact with the sensor attachment surface 5a62 and is reducing in thickness toward the flange portion 5a4-side. Sensor fixation flanges 92 are provided on both sides of the sensor portion 91b. The sensor portion 91b is fixed so as to be arranged into close contact with the sensor attachment surface 5a62 with use of sensor fixation screws 98. These terminal collection portion 91a and sensor portion 91b are fixed so as to be positioned on the sensor attachment portion 5a62.

The first pipe 94, which is generally circular in cross-section and includes a flatly shaped surface in abutment with the flat surface portion 5a61, is connected to an opposite side of the terminal collection portion 91a from the sensor portion 91b-side. Pipe fixation flanges 93 are provided on both sides of the first pipe 94. The stroke sensor 90 is fixed so as to be arranged in close contact with the flat surface portion 5a61 with use of the sensor fixation screws 98. The second pipe 95 provided at the end 97 of the first pipe 94 is generally circular in cross-section, and is disposed so as to be able to be erected by itself generally perpendicularly to the flat surface portion 5a61. Even if a force perpendicular to the flat surface portion 5a61 is applied to the connection terminal 96 and the second pipe 95, the end 97 is supported by the flat surface portion 5a61. Further, even if a force is applied to the connection terminal 96 and the second pipe 95 in a direction causing them to tilt, the pipe fixation flanges 93 can prevent or reduce the tilt of the second pipe 95. The second pipe 95 is vertically erected at a position that would correspond to a through-hole 5c formed on the second unit housing 5b, which will be described below, upon assembling.

The second unit housing 5b is made of a generally cuboid aluminum block, and includes the first attachment surface 5b1, the second attachment surface 5b2, and an oil passage connection surface 5b3 (refer to FIGS. 1 and 2). The first unit housing 5a is attached to the first attachment surface 5b1 with bolts 5a1. The second attachment surface 5b2 is formed at a position opposite from this first attachment surface 5b1. The oil passage connection surface 5b3 is formed between the first attachment surface 5b1 and the second attachment surface 5b2 on the reservoir 4-side. The plurality of oil passages is formed in the second unit housing 5b by piercing the second unit housing 5b. Attachment holes for attaching the various kinds of electromagnetic valves 20 and the hydraulic sensors 91, 92, and 93 are formed on the second attachment surface 5b2 (refer to FIGS. 11, 12, and 15). The plurality of oil passages is formed on the oil passage connection surface 5b3 by piercing the oil passage connection surface 5b3, to which the pipes leading to the individual wheel cylinders 8 are connected. Further, coils of the electromagnetic valves 20, and the ECU 100 are attached to the second attachment surface 5b2. The ECU 100 includes a control substrate 105a that calculates a control amount based on the various kinds of sensor signals to output a control instruction. Further, the through-hole 5c, through which the second pipe 95 of the stroke sensor 90 penetrates, is opened at a position slightly offset from a center of the second unit housing 5b toward the brake pedal-side.

A reservoir-side recessed portion 5b11, which is obtained by cutting out the aluminum material toward the second attachment surface 5b2, is formed on the first attachment surface 5b1 (refer to FIG. 9). The reservoir-side recessed portion 5b11 is opened on the oil passage connection surface 5b3-side. In other words, the reservoir-side recessed portion 5b11, which is obtained by cutting out the aluminum material toward a bottom surface 5b4, is formed on the oil passage connection surface 5b3. This formation of the reservoir-side recessed portion 5b11 can prevent a lower portion of the reservoir 4 and the second unit housing 5b from interfering with each other. Further, this formation reduces a distance between the reservoir 4 and the first unit housing 5a, thereby reducing a size of the entire apparatus. A connector-side recessed portion 5b12, which is obtained by cutting out the aluminum material toward the second attachment surface 5b2, is formed on the first attachment surface 5b1. The connector-side recessed portion 5b12 is formed at a position adjacent to a second connector portion 102a, and is opened to the lower surface 5b4-side opposite from the oil passage connection surface 5b3. This formation of the connector-side recessed portion 5b12 can prevent a hand of a worker and the second unit housing 5b from interfering with each other when the second unit housing 5b is connected to the second connector portion 102a. Therefore, the assemblability can be improved.

Further, a sensor-side recessed portion 5b13 (a recessed portion), which is obtained by cutting out the aluminum material toward the second attachment surface 5b2, is formed on the first attachment surface 5b1. The sensor-side recessed portion 5b13 is formed so as to correspond to a position where the stroke sensor 90 would be set in, and is opened to the brake pedal-side side surface 5b5-side of the second unit housing 5b. This formation of the sensor-side recessed portion 5b13 can construct a space between the first unit housing 5a and the second unit housing 5b, and allows the stroke sensor 90 to be disposed in this space, thereby preventing the stroke sensor 90 and the second unit housing 5b from interfering with each other. Therefore, this configuration reduces a distance between the first unit housing 5a and the second unit housing 5b, thereby reducing the size of the entire apparatus.

The ECU 100 includes the control substrate 105a, a first connection portion 101a, and the second connector portion 102a. The control substrate 105a is contained in a casing made from a resin material, and a microcomputer and the like are mounted on the control substrate 105a. A wiring that outputs a driving signal from the control substrate 105a to the motor M is connected to the first connector portion 101a. A CAN communication line that transmits and receives information to and from the control substrate 105a and another controller is connected to the second connector portion 102a. As illustrated in the cross-sectional view of FIG. 11 taken along the line B-B and the cross-sectional view of FIG. 12 taken along the line C-C, the stroke sensor 90 and the various kinds of electromagnetic valves 20 are disposed at positions opposite from each other via the second unit housing 5b. This layout prevents or reduces an influence that otherwise might be exerted on the stroke sensor 90, even if a leakage flux occurs according to the power supply to the coils of the electromagnetic valves 20. When the stroke sensor 90 attached to the first unit housing 5a is attached to the second unit housing 5b, the second pipe 95 thereof penetrates through the through-hole 5c. Then, the connection terminal 96 reaches the control substrate 105a, by which the stroke sensor 90 is electrically connected thereto. In this manner, the electric connection between the externally provided stroke sensor 90 and the control substrate 105a can be internally directly established similarly to the other electromagnetic valves, the sensors, and the like, which eliminates a necessity of additionally forming a connector portion and the like, realizing the low-cost attachment of the stroke sensor 90.

FIG. 13 illustrates the ECU according to the first embodiment with the substrate thereof removed therefrom, as viewed from the outside. A metallic plate 110 is set inside the ECU 100. A heatsink 111 for dissipating heat generated at solenoids SOL is set on the metallic plate 110. Further, through-holes are formed on the metallic plate 110 at positions respectively corresponding to the electromagnetic valves and the sensors. Plunger portions of the individual electromagnetic valves protruding from the through-holes are provided with the solenoids SOL surrounding the plunger portions, respectively. Each of the solenoids SOL is provided with a terminal extending in a direction perpendicular to a surface of the sheet of FIG. 13 and reaching the not-illustrated control substrate 105a, thereby electrically connecting the solenoid SOL and the control substrate 105a to each other. A plate through-hole 5c1 is formed at a position that is a generally center of the metallic plate 110 and slightly offset toward the brake pedal. The second pipe 95 of the stroke sensor 90 is inserted through the plate through-hole 5c1 to protrude therefrom, thereby connecting the stroke sensor 90 to the control substrate 105a.

As illustrated in the exploded perspective view of FIG. 15, the stroke sensor 90 is attached to the first unit housing 5a. After that, the second unit housing 5b and the first unit housing 5a are attached to each other. At this time, they are attached to each other in such a manner that the second pipe 95 of the stroke sensor 90 penetrates through the through-hole 5c of the second unit housing 5b. Further, connection ports 5a9 are formed on the first side surface 5a6 of the first unit housing 5a. Each of the connection ports 5a9 establishes a liquid-tight connection with the oil passage for connecting the brake fluid flowing out from the first unit housing 5a to the oil passage formed in the second unit housing 5b. Similarly, ports 5b9 are formed on the first attachment surface 5b1 of the second unit housing 5b. Each of the ports 5b9 is opened at a position facing the connection port 5a9, and is connected to the connection port 5a9 via an O-ring O-RING. When the first unit housing 5a and the second unit housing 5b are attached to each other, positions of both the unit housings are determined with use of a positioning pin PIN, and the connection port 5a9 is brought into abutment with the port 5a9 with the O-ring O-RING interposed therebetween. This attachment allows the first unit housing 5a and the second unit hosing 5b to be liquid-tightly joined to each other. Lastly, the ECU 100 is attached. At this time, in addition to the respective terminals of the electromagnetic valves and the sensors, the connection terminal 96 of the stroke sensor 90 is also connected to the control substrate 105a so as to be stuck into the terminal hole provided on the control substrate 105a. Then, they are electrically connected to the control substrate 105a by soldering the respective terminal portions.

Advantageous Effects of First Embodiment

In the following description, advantageous effects of the brake apparatus described in the first embodiment will be listed.

(1) The brake apparatus includes the first unit housing 5a (a master cylinder housing) including the primary piston 54P and the secondary piston 54S (a piston) configured to carry out the axial stroke in the cylinder formed therein via the push rod 30 (a rod) operable according to the operation performed by the driver on the brake pedal, and the second unit housing 5b (a valve housing) including the oil passages through which the brake fluid flows after flowing out from inside the cylinder according to the stroke of the primary piston 54P and the secondary piston 54S. The second unit housing 5b further includes the electromagnetic valves configured to block and open the oil passages. The first unit housing 5a is attached to the first attachment surface 5b1 (one side surface)-side of the second unit housing 5b. The brake apparatus further includes the stroke sensor 90 disposed between the first side surface 5a6 (one side surface) of the first unit housing 5a and the first attachment surface 5b1 of the second unit housing 5b and configured to detect the amount of the axial stroke of the primary piston 54P and the secondary piston 54S, the ECU 100 (a control unit) attached to the second attachment surface 5b2 (opposite side surface)-side of the second unit housing 5b and configured to drive the electromagnetic valves and receive the output of the stroke sensor 90, and the through-hole 5c provided on the second unit housing 5b and formed to allow the signal line to pass through the through-hole 5c. The signal line is configured to transmit the output of the stroke sensor 90 to the ECU 100. Therefore, the first embodiment allows the stroke sensor 90 and the ECU 100 to be internally connected to each other similarly to the other electromagnetic valves and the like, and thus can prevent or cut down the cost increase.

(2) In the brake apparatus according to the above-described item (1), the signal line is the bus bar. Therefore, the first embodiment can realize the electric connection with a low-cost configuration.

(3) In the brake apparatus according to the above-described item (2), the ECU 100 includes the control substrate 105a (a controller), and the first connector portion 101a and the second connector portion 102a (a connector) configured to electrically connect the control substrate 105a to the outside. Therefore, the first embodiment allows power to be supplied from the outside to the control substrate 105a, thereby allowing power to be supplied from the control substrate 105a to the stroke sensor 90, and thus can prevent a cost increase that otherwise would be caused due to a necessity of additionally providing a power supply line and the like for the stroke sensor 90.

(4) In the brake apparatus according to the above-described item (1), the stroke sensor 90 is the Hall element (a magnetic sensor) configured to detect the stroke of the primary piston 54P based on the magnetic change. The first unit housing 5a is a non-magnetic member. The stroke sensor 90 is attached to the sensor attachment surface 5a62 (the wall) of the first unit housing 5a. In other words, since the first unit housing 5a is the non-magnetic member, the first embodiment improves accuracy of detecting the motion of the primary piston 54P based on the magnetic change while eliminating a magnetic influence. Further, since the stroke sensor 90 is attached to the first unit housing 5a, the first embodiment can reduce the distance to the primary piston 54P, thereby improving the detection accuracy.

(5) In the brake apparatus according to the above-described item (4), the recessed portion is formed on the sensor attachment surface 5a62 (the wall) of the first unit housing 5a where the stroke sensor 90 is attached, and the stroke sensor 90 is disposed in the recessed portion. Therefore, the first embodiment allows the stroke sensor 90 and the primary piston 54P to be positioned close to each other with the distance therebetween shortened, and thus can further improve the detection accuracy.

(6) In the brake apparatus according to the above-described item (5), the signal line is disposed in the sensor attachment surface 5a62 and the flat surface portion 5a61 (the recessed portion) of the first unit housing 5a. Therefore, the first embodiment allows the first unit housing 5a and the second unit housing 5b to be positioned close to each other with the distance therebetween shortened, and thus can reduce the size of the entire apparatus.

(7) In the brake apparatus according to the above-described item (6), the signal line includes the first pipe 94 (the extension portion) extending along the first unit housing 5a in the flat surface portion 5a61, and the second pipe 95 (the connection end) configured to transmit the signal to the ECU 100 by being erected from the first pipe 94 in the direction toward the second unit housing 5b and being connected to the ECU 100 from an axial direction. Therefore, the first embodiment allows the force applied in the axial direction of the second pipe 95 to be received by the flat surface portion 5a61 of the first unit housing 5a when the stroke sensor 90 and the control substrate 105a are connected to each other, and thus can improve the assemblability.

(8) In the brake apparatus according to the above-described item (7), the second pipe 95 is erected so as to be located at the position corresponding to the through-hole 5c. Therefore, the first embodiment can improve the assemblability when each of the housings and the ECU 100 are attached.

(9) In the brake apparatus according to the above-described item (5), the stroke sensor 90 is disposed on the brake pedal-side so as to detect the stroke of the push rod 30. The first pipe 94 (the signal line) is disposed in the direction away from the brake pedal along the cylinder. Therefore, the first embodiment can improve layout flexibility when the first pipe 94 is laid out.

(10) In the brake apparatus according to the above-described item (5), a space adjacent to the flat surface portion 5a61 and the sensor attachment surface 5a62 is in communication with the outside. Therefore, the first embodiment can improve a performance of dissipating heat from the stroke sensor 90 and the first unit housing 5a.

(11) In the brake apparatus according to the above-described item (1), the sensor-side recessed portion 5b13 (the recessed portion) is formed on the first attachment surface 5b1 (the one side surface) of the second unit housing 5b, and the stroke sensor 90 is disposed in the sensor-side recessed portion 5b13. Therefore, the first embodiment allows the first unit housing 5a and the second unit housing 5b to be positioned close to each other with the distance therebetween shortened, and thus can reduce the size of the entire apparatus.

(12) In the brake apparatus according to the above-described item (1), the recessed portion (the flat surface portion 5a61, the sensor attachment surface 5a62, or the sensor-side recessed portion 5b13) is formed on the first attachment surface 5b1 of the second unit housing 5b or the surface of the first unit housing 5a that faces the second unit housing 5b, and the stroke sensor 90 is disposed in the recessed portion. Therefore, the first embodiment allows the first unit housing 5a and the second unit housing 5b to be positioned close to each other with the distance therebetween shortened, and thus can reduce the size of the entire apparatus.

(13) In the brake apparatus according to the above-described item (12), a space in the recessed portion is in communication with the outside. Therefore, the first embodiment can improve the performance of dissipating the heat.

(14) In the brake apparatus according to the above-described item (13), the first unit housing 5a includes the connection ports 5a9 each liquid-tightly connected to the oil passage for connecting the brake fluid flowing out from inside the cylinder to the oil passage formed in the second unit housing 5b. The stroke sensor 90 is liquid-tightly configured. More specifically, the O-ring 95b is disposed on the second pipe 95 of the stroke sensor 90, by which liquid tightness is secured between the second pipe 95 and an inner wall of the through-hole 5c. This configuration allows the first attachment surface 5b1-side and the second attachment surface 5b2-side of the second unit housing 5b to be defined liquid-tightly, thereby preventing water, dust, and the like from entering from the outside into the ECU 100.

(15) The brake apparatus includes the first unit housing 5a (a master cylinder housing) including the cylinder portion therein and also including the primary piston 54P (a piston) configured to carry out the axial stroke in the cylinder portion via the push rod 30 (a rod) operable according to the operation performed by the driver on the brake pedal, and the second unit housing 5b (a valve housing) including the oil passages through which the brake fluid flows after flowing out from inside the cylinder portion according to the stroke of the primary piston 54P and the electromagnetic valves configured to block and open the oil passages. The first unit housing 5a is attached to the first attachment surface 5b1 (one side surface)-side of the second unit housing 5b. The brake apparatus further includes the stroke sensor 90 disposed between the first unit housing 5a and the first attachment surface 5b1 (the one side surface) of the second unit housing 5b and configured to detect the amount of the axial stroke of the primary piston 54P, the ECU 100 (a control unit) attached to the second attachment surface 5b2 (opposite side surface)-side of the second unit housing 5b and configured to drive the electromagnetic valves and receive the output of the stroke sensor 90, and the through-hole 5c provided on the second unit housing 5b and formed in such a manner that the second pipe 95 (a connection member) for electrically connecting the stroke sensor 90 and the ECU 100 to each other is disposed therein. Therefore, the first embodiment allows the stroke sensor 90 and the ECU 100 to be internally connected to each other similarly to the other electromagnetic valves and the like, and thus can prevent or cut down the cost increase.

(16) In the brake apparatus according to the above-described item (15), the space for disposing the stroke sensor 90 therein is formed between the first attachment surface 5b1 (the one side surface) of the second unit housing 5b and the sensor attachment surface 5a62 (the wall) of the first unit housing 5a that faces the first attachment surface 5b1 of the second unit housing 5b. Therefore, since the stroke sensor 90 is disposed by utilizing the space, the first embodiment allows the first unit housing 5a and the second unit housing 5b to be positioned close to each other with the distance therebetween shortened, and thus can reduce the size of the entire apparatus.

(17) In the brake apparatus according to the above-described item (16), the stroke sensor 90 is attached to the first unit housing 5a. Therefore, the first embodiment allows the stroke sensor 90 and the primary piston 54P to be positioned close to each other with the distance therebetween shortened, and thus can improve the detection accuracy.

(18) In the brake apparatus according to the above-described item (17), the connection member includes therein the bus bar for establishing the electric connection, and the first pipe 94 and the second pipe 95, which are a surrounding portion that surrounds the bus bar and is stiffer than the bus bar. The first pipe 94 includes the first pipe 94 (the extension portion) extending along the first unit housing 5a forming the space, and the second pipe 95 and the connection terminal 96 (the connection end) configured to transmit the signal to the ECU 100 by being erected from the first pipe 94 in the direction toward the second unit housing 5b and being connected to the ECU 100 from the axial direction. Therefore, the first embodiment allows the force applied in the axial direction of the second pipe 95 to be received by the flat surface portion 5a61 of the first unit housing 5a when the stroke sensor 90 and the control substrate 105a are connected to each other, and thus can improve the assemblability.

(19) In the brake apparatus according to the above-described item (18), the second pipe 95 and the connection terminal 96 are erected so as to be located at the position corresponding to the through-hole 5c when the first unit housing 5a and the second unit housing 5b are attached to each other. Therefore, the first embodiment can improve the assemblability when each of the housings and the ECU 100 are attached.

(20) The brake apparatus includes the first unit housing 5a (a master cylinder housing) including the primary piston 54P (a piston) configured to carry out the stroke via the push rod 30 (a rod) axially operable according to the operation performed by the driver on the brake pedal, the stroke sensor 90 attached to the first unit housing 5a and configured to detect the amount of the axial stroke of the primary piston 54P, the second unit housing 5b (a valve housing) including the oil passages through which the brake fluid flows and the electromagnetic valves configured to block and open the oil passages, and the ECU 100 (a control unit) configured to drive the electromagnetic valves and receive the output of the stroke sensor 90. The first unit housing 5a is attached to the first attachment surface 5b1 (one side surface)-side of the second unit housing 5b, and the ECU 100 is attached to the second attachment surface 5b2 (opposite surface side)-side of the second unit housing 5b. The stroke sensor 90 and the ECU 100 are electrically connected to each other via the bus bar with the second unit housing 5b interposed therebetween. Therefore, the first embodiment allows the stroke sensor 90 and the ECU 100 to be internally connected to each other similarly to the other electromagnetic valves and the like with the low-cost configuration, and thus can prevent or cut down the cost increase.

Having described several embodiments of the present invention, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

This application claims priority to Japanese Patent Application No. 2014-96895 filed on May 8, 2014. The entire disclosure of Japanese Patent Application No. 2014-96895 filed on May 8, 2014 including the specification, the claims, the drawings, and the summary is incorporated herein by reference in its entirety.

REFERENCE SIGNS LIST 1 brake apparatus
2 brake pedal
4 reservoir
5 master cylinder unit
5a first unit housing
5b second unit housing
5a2 master cylinder container portion
7 pump unit
8 wheel cylinder
12a intake pipe
20 electromagnetic valve
27 stroke simulator
30 push rod
31 stroke simulator IN valve
32 stroke simulator OUT valve
50 master cylinder mechanism
54 piston
60 hydraulic control unit
70 gear pump
75 pump housing
90 stroke sensor
90a holder member
90b permanent magnet
200 installment panel
M motor

The invention claimed is:

1. A brake apparatus comprising:
a master cylinder housing including a piston configured to carry out an axial stroke in a cylinder formed therein via a rod operable according to an operation performed by a driver on a brake pedal;
a valve housing including an oil passage through which brake fluid flows after flowing out from inside the cylinder according to the stroke of the piston, and an electromagnetic valve configured to block and open the oil passage, the master cylinder housing being attached to one side surface-side of the valve housing;
a stroke sensor disposed between one side surface of the master cylinder housing and one side surface of the valve housing, and configured to detect an amount of the axial stroke of the piston;
a control unit attached to an opposite side surface-side of the valve housing, and configured to drive the electromagnetic valve and receive an output of the stroke sensor; and
a through-hole provided on the valve housing and formed to allow a signal line to pass through the through-hole, the signal line being configured to transmit the output of the stroke sensor to the control unit.

2. The brake apparatus according to claim 1, wherein the signal line is a bus bar.

3. The brake apparatus according to claim 2, wherein the control unit includes a controller, and a connector configured to electrically connect the controller to an outside.

4. The brake apparatus according to claim 1, wherein the stroke sensor is a magnetic sensor configured to detect the stroke of the piston based on a magnetic change,
wherein the master cylinder housing is a non-magnetic member, and
wherein the stroke sensor is attached to a wall of the master cylinder housing.

5. The brake apparatus according to claim 4, wherein a recessed portion is formed on the wall of the master cylinder housing where the stroke sensor is attached, and the stroke sensor is disposed in the recessed portion.

6. The brake apparatus according to claim 5, wherein the signal line is disposed in the recessed portion of the master cylinder housing.

7. The brake apparatus according to claim 6, wherein the signal line includes an extension portion extending along the master cylinder housing in the recessed portion, and a connection end configured to transmit a signal to the control unit by being erected from the extension portion in a direction toward the valve housing and being connected to the control unit from an axial direction.

8. The brake apparatus according to claim 7, wherein the connection end is erected so as to be located at a position corresponding to the through-hole.

9. The brake apparatus according to claim 5, wherein the stroke sensor is disposed on a brake pedal-side so as to detect a stroke of the rod, and
wherein the signal line is disposed in a direction away from the brake pedal along the cylinder.

10. The brake apparatus according to claim 5, wherein a space in the recessed portion is in communication with an outside.

11. The brake apparatus according to claim 1, wherein a recessed portion is formed on the one side surface of the valve housing, and the stroke sensor is disposed in the recessed portion.

12. The brake apparatus according to claim 1, wherein a recessed portion is formed on the one side surface of the valve housing or a surface of the master cylinder housing that faces the valve housing, and the stroke sensor is disposed in the recessed portion.

13. The brake apparatus according to claim 12, wherein a space in the recessed portion is in communication with an outside.

14. The brake apparatus according to claim 13, wherein the master cylinder housing includes a connection port liquid-tightly connected to the oil passage for connecting the brake fluid flowing out from inside the cylinder to the oil passage formed in the valve housing, and
wherein the stroke sensor is liquid-tightly configured.

15. A brake apparatus comprising:
a master cylinder housing including a cylinder portion therein, and including a piston configured to carry out an axial stroke in the cylinder portion via a rod operable according to an operation performed by a driver on a brake pedal;
a valve housing including an oil passage through which brake fluid flows after flowing out from inside the cylinder portion according to the stroke of the piston, and an electromagnetic valve configured to block and open the oil passage, the master cylinder housing being attached to one side surface-side of the valve housing;
a stroke sensor disposed between the master cylinder housing and one side surface of the valve housing, and configured to detect an amount of the axial stroke of the piston;
a control unit attached to an opposite side surface-side of the valve housing, and configured to drive the electromagnetic valve and receive an output of the stroke sensor; and
a through-hole provided on the valve housing, the through-hole being formed in such a manner that a connection member for electrically connecting the stroke sensor and the control unit to each other is disposed therein.

16. The brake apparatus according to claim 15, wherein a space for disposing the stroke sensor therein is formed between the one side surface of the valve housing and a wall of the master cylinder housing that faces the one side surface of the valve housing.

17. The brake apparatus according to claim 16, wherein the stroke sensor is attached to the master cylinder housing.

18. The brake apparatus according to claim 17, wherein the connection member includes therein a bus bar for establishing an electric connection, and a surrounding portion that surrounds the bus bar and is stiffer than the conductive member, and
wherein the connection member includes an extension portion extending along the master cylinder housing forming the space, and a connection end configured to transmit a signal to the control unit by being erected from the extension portion in a direction toward the valve housing and being connected to the control unit from an axial direction.

19. The brake apparatus according to claim 18, wherein the connection end is erected so as to be located at a position corresponding to the through-hole when the master cylinder housing and the valve housing are attached to each other.

20. A brake apparatus comprising:
a master cylinder housing including a piston configured to carry out a stroke via a rod axially operable according to an operation performed by a driver on a brake pedal;
a stroke sensor attached to the master cylinder housing and configured to detect an amount of the axial stroke of the piston;
a valve housing including an oil passage through which brake fluid flows, and an electromagnetic valve configured to block and open the oil passage; and
a control unit configured to drive the electromagnetic valve and receive an output of the stroke sensor,
wherein the master cylinder housing is attached to one side surface-side of the valve housing, and the control unit is attached to an opposite side surface-side of the valve housing, and
wherein the stroke sensor and the control unit are electrically connected to each other via a bus bar with the valve housing interposed therebetween.

* * * * *